July 16, 1968  G. G. ROCK  3,392,448
MAP PLOTTER
Filed Feb. 24, 1965  10 Sheets-Sheet 2
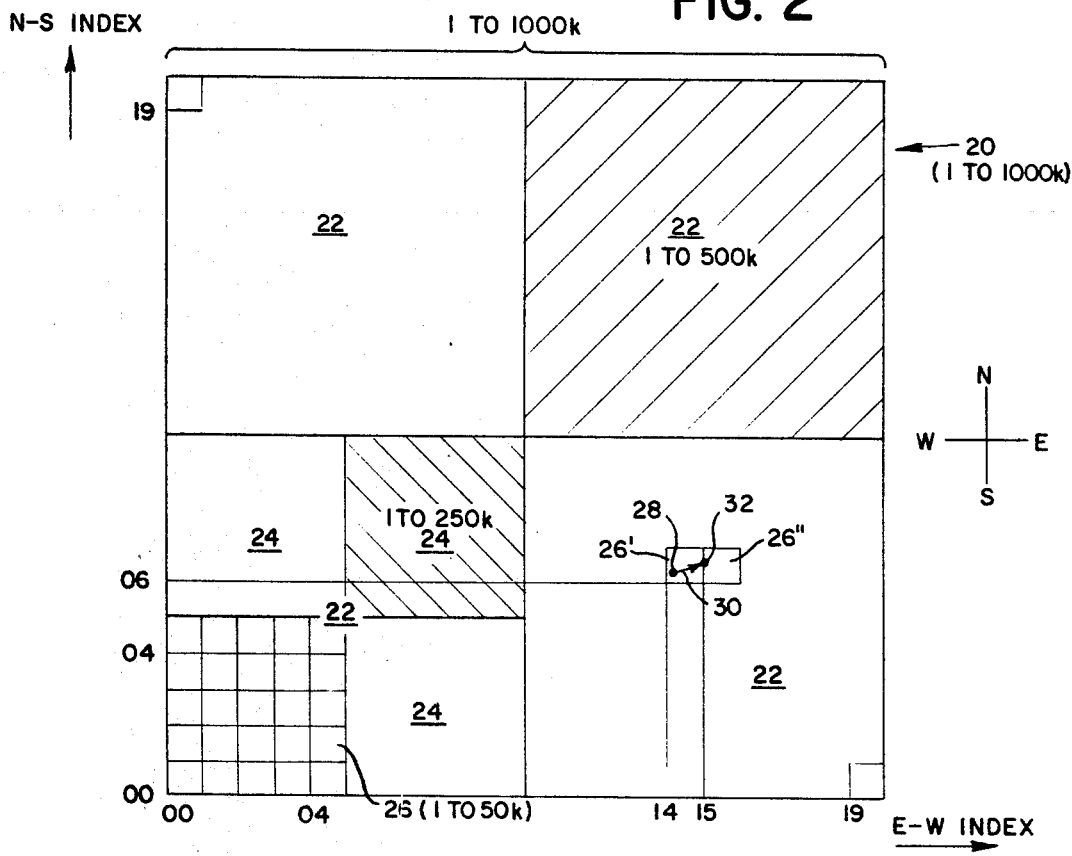
FIG. 2
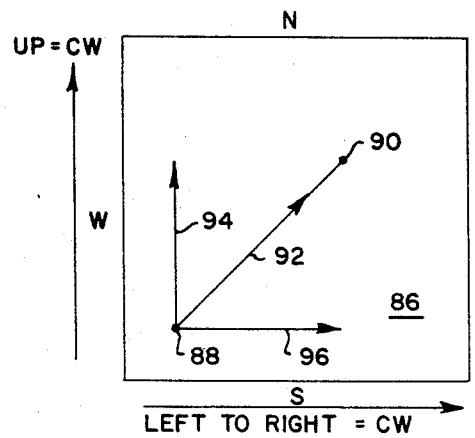
FIG. 3A
FIG. 3B
| | UP TRACK | | | |
|---|---|---|---|---|
| | N | E | S | W |
| UP–DOWN (11) | CW | CW | CCW | CCW |
| LEFT–RIGHT (12) | CW | CCW | CCW | CW |
INVENTOR.
GEORGE G. ROCK
BY *Darby & Darby*
ATTORNEYS

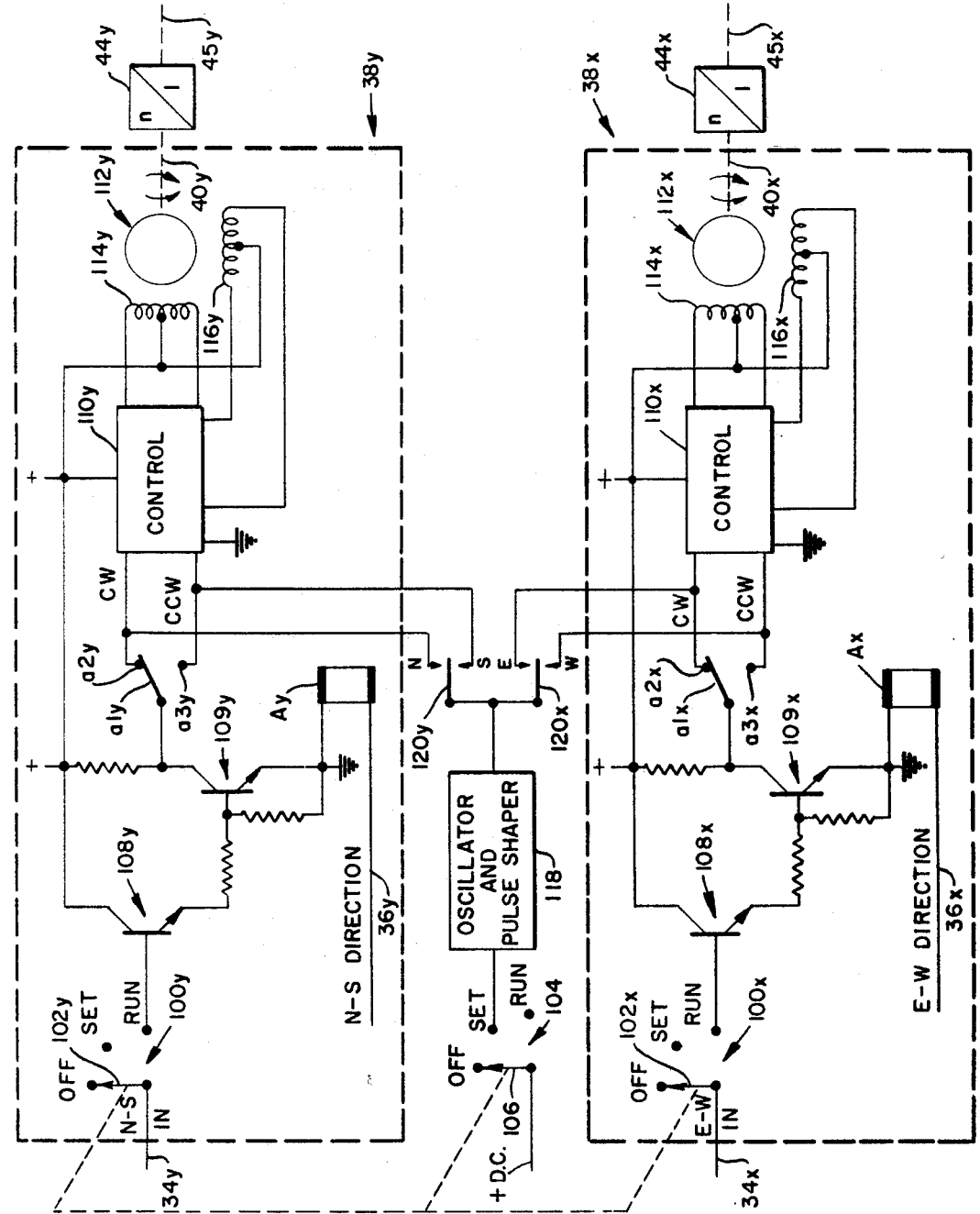

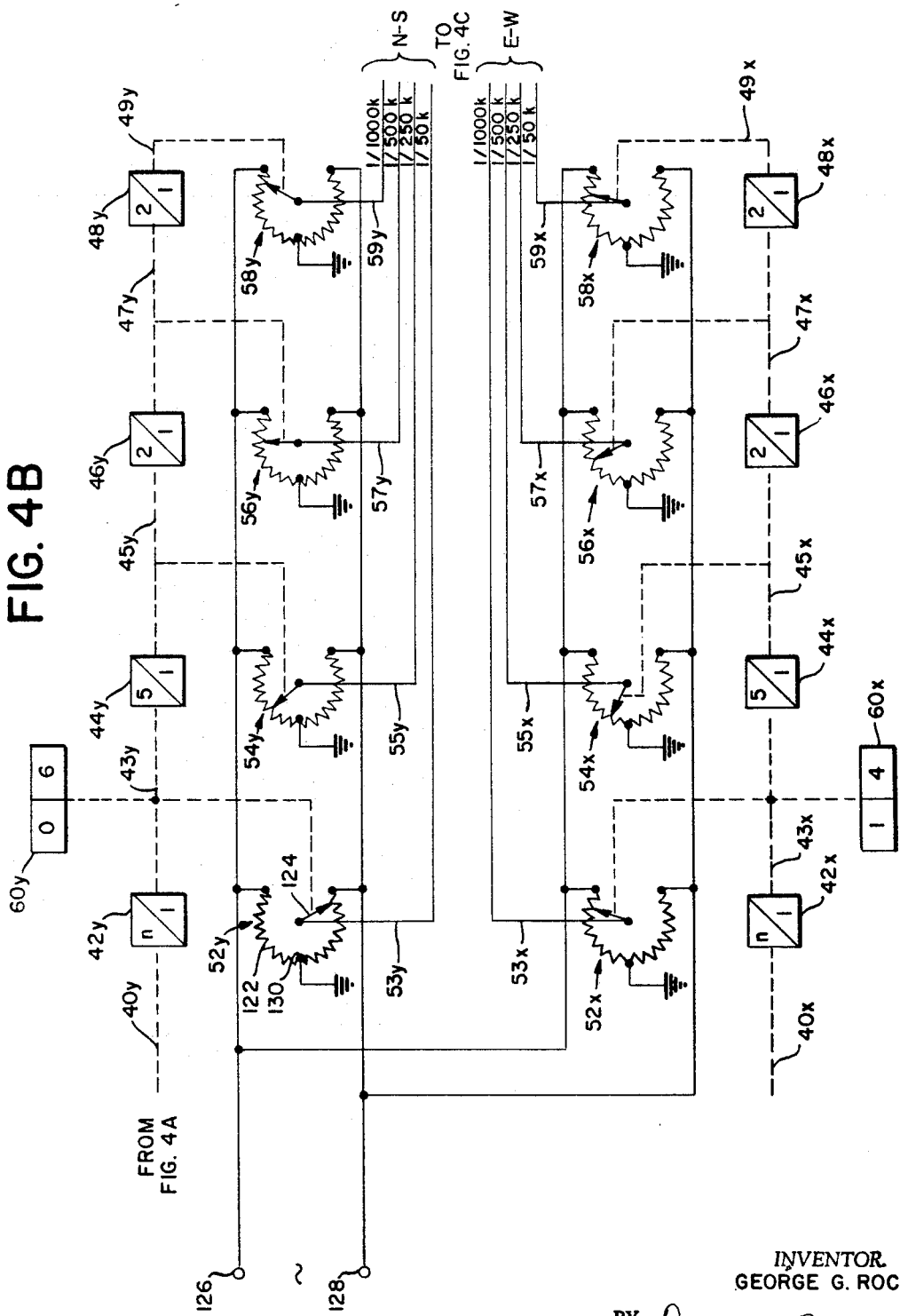

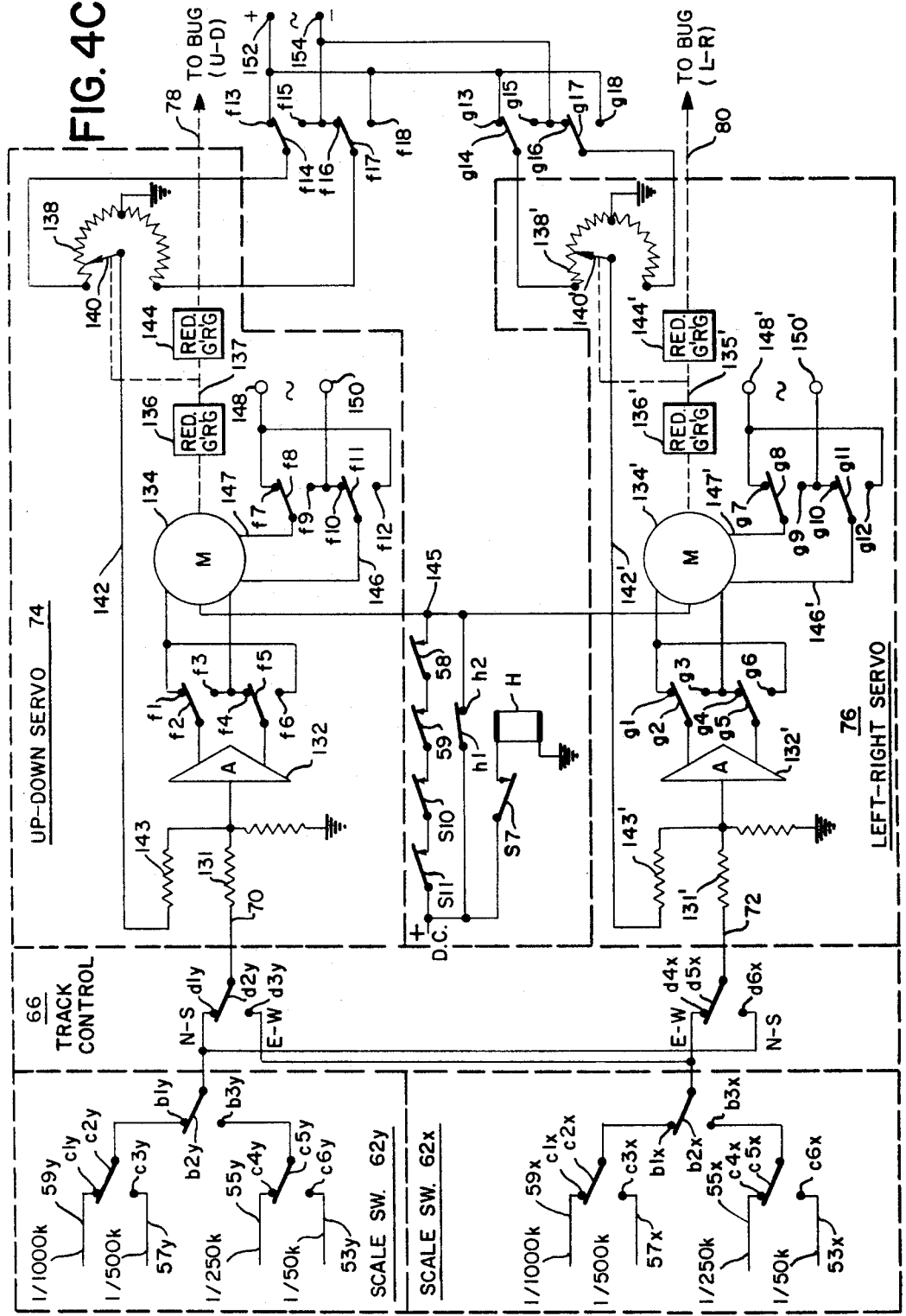

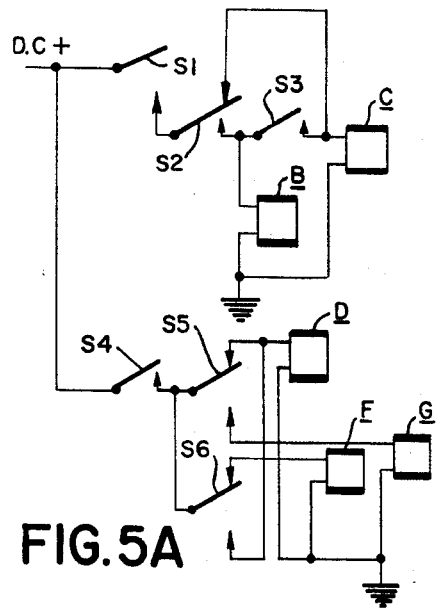
FIG. 5A
FIG. 5B
| SCALE | SWITCH | | | RELAY | |
|---|---|---|---|---|---|
| | S1 | S2 | S3 | B | C |
| 1/1000k | | | | | |
| 1/500k | X | | | | X |
| 1/250k | X | X | | X | |
| 1/50k | X | X | X | X | X |
FIG. 5C
| UP-DIRECTION | SWITCH | | | RELAY | | |
|---|---|---|---|---|---|---|
| | S4 | S5 | S6 | D | F | G |
| NORTH | X | X | | | X | X |
| EAST | X | | | X | X | |
| SOUTH | | | | | | |
| WEST | X | X | X | X | | X |
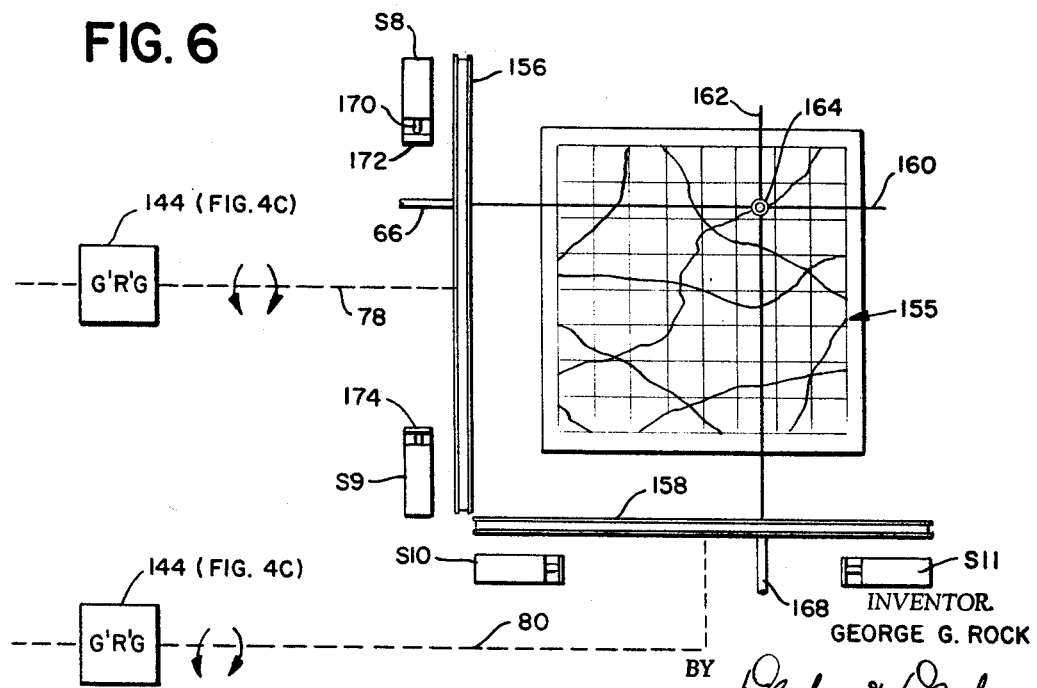
FIG. 6
INVENTOR.
GEORGE G. ROCK
BY Darby & Darby
ATTORNEYS July 16, 1968  G. G. ROCK  3,392,448
MAP PLOTTER Filed Feb. 24, 1965  10 Sheets-Sheet 9

INVENTOR.
GEORGE G. ROCK
BY Darby & Darby
ATTORNEYS

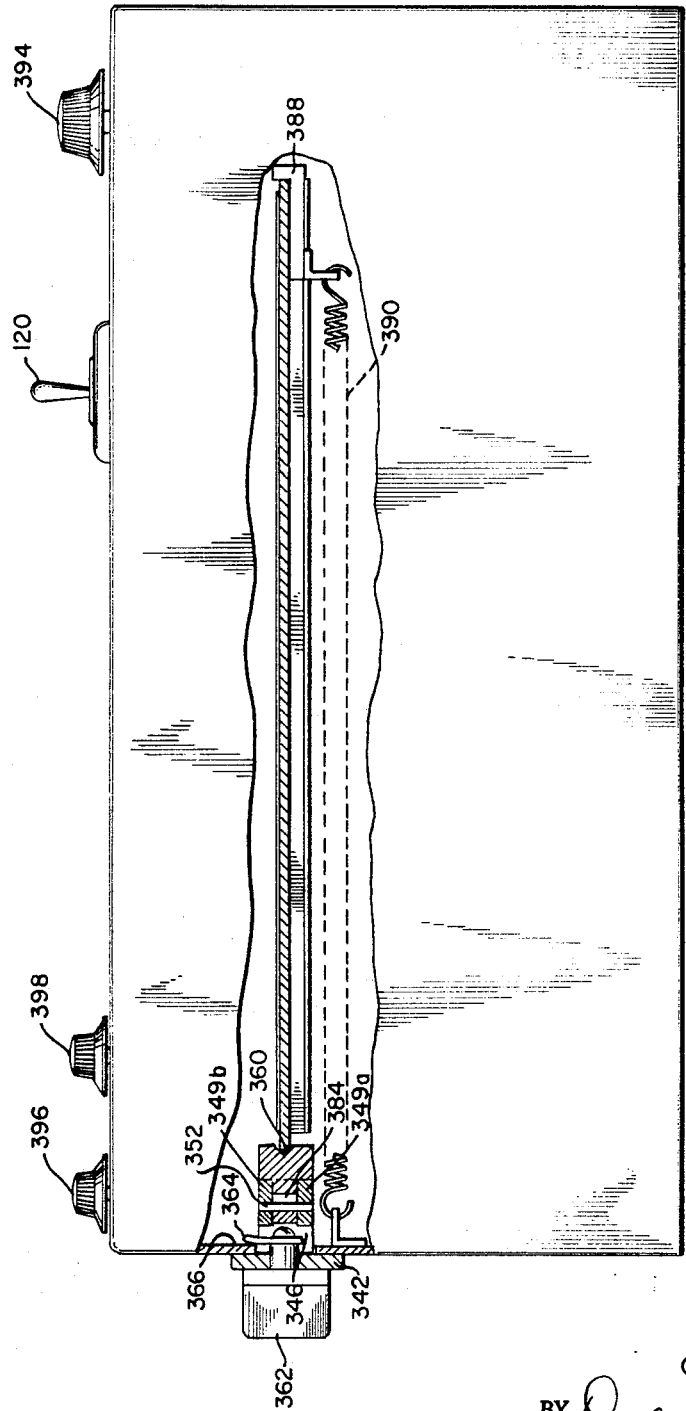

United States Patent Office 3,392,448
Patented July 16, 1968

3,392,448
MAP PLOTTER
George G. Rock, New York, N.Y., assignor to Loral Corporation, New York, N.Y., a corporation of New York
Filed Feb. 24, 1965, Ser. No. 434,903
46 Claims. (Cl. 33—1)

The present invention relates to map plotters, and, in particular, to a map plotter capable of tracking on one of a plurality of scales regardless of the orientation of the inserted map.

A map plotter is a device commonly used by a navigator of an aircraft, ship, ground vehicle or other craft to plot his position with respect to ground. Generally speaking, incoming navigational data is employed to position an indicator means with respect to a map so that the position of the indicator manifests the craft position at any given time relative to known navigational fixes, check points and/or terrain features. The navigator is thus relieved of the burden of mental visualization which, especially in the case of fast-moving aircraft, can be complicated by the need to interpret and integrate a vast array of meters, dials and pointers.

There are two basic types of map plotter; one is a continuous strip type of display wherein a map of a given track or path is prepared and then continuously unrolled past the indicator which is positioned over the portion of the map visible to the navigator. The second, and the one to which the present invention pertains, is known as an area map plotter and requires that a separate map be inserted for different sections of terrain being traversed. When using an area map plotter, the maps are normally arranged in a carrying case so that one after the other may be inserted into the plotter as the craft traverses the areas encompassed by the individual maps.

In a direct view area map plotter, the map is stationary and the indicator, hereinafter referred to as the plotter bug, is positioned over the map dependent upon the incoming navigational data. A direct map plotter has the advantages of not being limited to a selected path and permitting the selection of maps having different scales whereby the navigator can pinpoint his position with varying degrees of accuracy depending upon his particular needs. Thus, if a pilot is traveling at a relatively high rate of speed he would probably prefer to use the smallest possible scale for purposes of convenience since it would be necessary to change the map less frequently. At a lower rate of speed, particularly in the case of a helicopter, or when attempting to accurately locate the craft position, it would be desirable to use a larger scale so that the craft position could be observed more precisely with respect to land. As a compromise, it may be preferable to use different scales between these two extremes. The present invention offers the advantage of automatically adjusting the mechanism to operate properly with the scale of any selected map, merely upon inserting the selected map into the apparatus.

In the simpler map plotters, the north direction is generally oriented toward the top of the map plotter display (hereinafter referred to as the up-direction). In many instances it is desirable to have other directions correspond to the up-direction. For example, certain individuals may find it psychologically less confusing to have the up-direction represent the craft tracking direction, at least in a general way. The present invention permits the user to select any one of the four principal compass directions as the up-direction by automatically adjusting itself to the selected orientation of the map inserted into the apparatus.

Thus, it is the general object of the present invention to provide a direct map plotter which has the capability of automatically and accurately tracking regardless of the scale and orientation of the inserted map.

A further object of the invention is to provide a map plotter which can be operated with any type of position input.

Another object of the invention is to provide an area map plotter in which the individual maps need not have any overlap from one map to an adjacent map.

Another object of the invention is to provide an area map plotter which can be used with standard aeronautical charts and tactical grid maps thus eliminating the need for specially processed transparencies, photographic slides or film strips.

Still another object of the invention is to provide a map plotter with which prearranged flight paths can be easily changed or reassigned in flight.

Briefly, in accordance with the invention, a plurality of differently scaled maps having selected coordinates (e.g., north-south and east-west) are prepared to a single predetermined size. Each map is mounted on a novel map mount which upon being inserted into the map holder "informs" the plotter control circuitry of the scale and orientation (i.e., up-direction) of the inserted map. Input nagivational position data (of any type) is derived for the aircraft or other object, the path of which is to be plotted, with respect to each of the coordinates. The data is continually derived for each scale, and converted to respective analog voltages which are fed to respective coordinate scale switches. The scale switches are controlled by signals from the map mount to pass those voltages corresponding to the scale of the inserted map.

The proper scaled coordinate voltages are then fed to a tracking control circuit, which controls the operation of two servos. The servo output shafts position an indicator over the inserted map along two axes (e.g., up-down and left-right axes). The tracking control circuit (which is actuated by signals initiated by the map mount depending upon the orientation of the inserted map) couples the scaled coordinate voltages to the proper servos and controls the rotation of the servo output shafts so that the up-down and left-right plotter axes properly correspond to the north-south and east-west axes of the inserted map. Consequently, the indicator always represents the aircraft position on the map regardless of its scale and orientation.

The invention further includes unique indicator means for manifesting the map area corresponding to the aircraft position, as well as the map scale and orientation.

The manner in which the above and other objects of the invention are achieved is fully described below with reference to the attached drawings, wherein:

FIGURE 2 is an explanatory diagram of a map, showing the manner in which the individual map scales are obtained;

FIGURE 3A is a diagram used to explain the necessary control of the plotter servos as expressed in tabular form in FIGURE 3B;

FIGURES 4A, 4B and 4C are circuit diagrams, partially in block diagram form, of portions of the preferred embodiment illustrated in FIGURE 1;

FIGURE 5A is a circuit diagram of the circuit which energizes the various relays which operate the switching circuits of FIGURES 4A, 4B and 4C;

FIGURES 5B and 5C are tabulations showing the manner in which the various relays and switches are energized depending upon the selected scale and map orientation;

FIGURE 6 is a schematic diagram of the plotter bug control;

FIGURE 10 is a front view, partially in section, of the apparatus shown in FIGURE 9.

Figure 1:
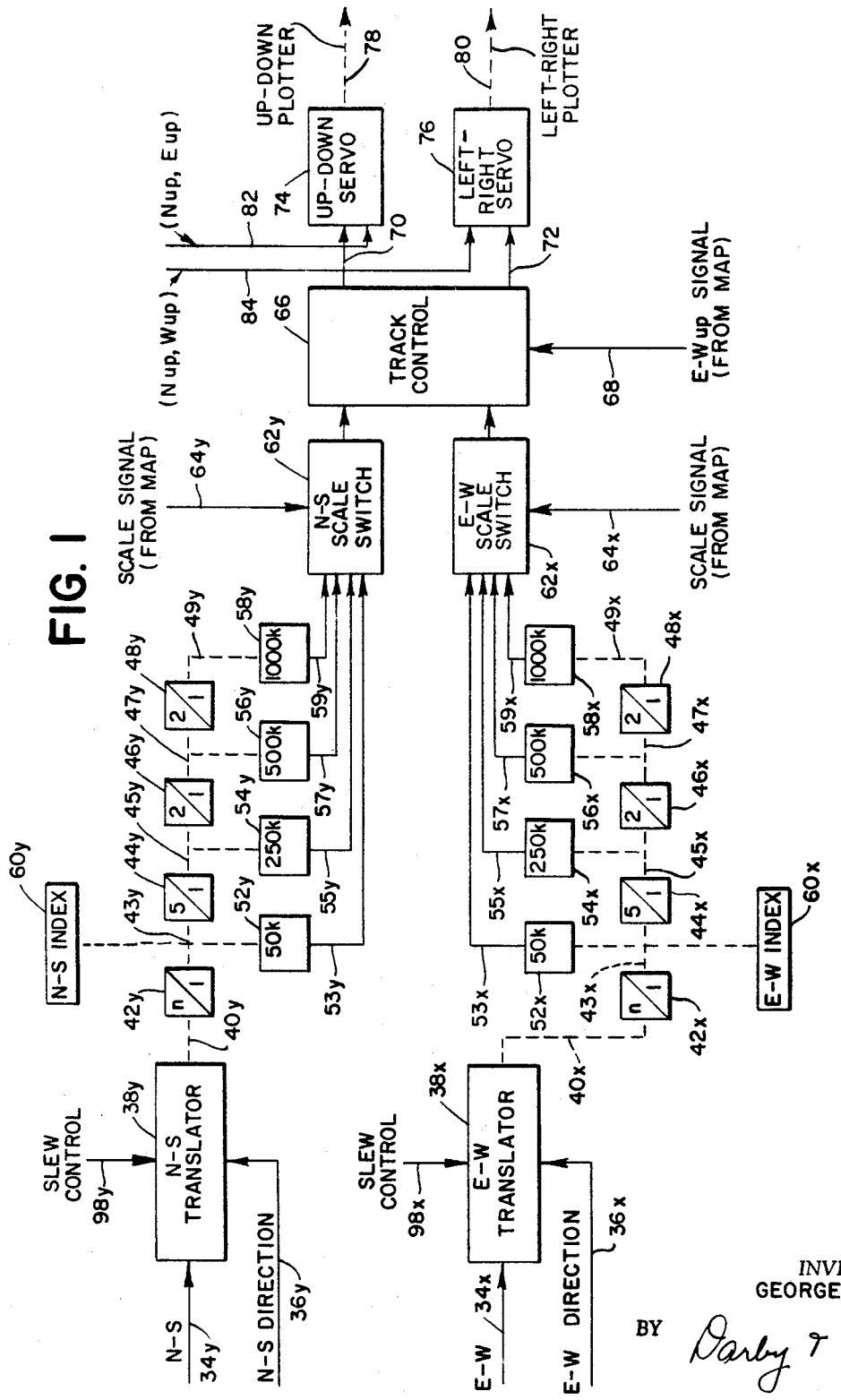
FIGURE 1 is a flow-type block diagram of a preferred embodiment of the invention.

Operation of the invention can best be understood by considering the block diagram of FIGURE 1 together with FIGURE 2, which shows a square section of a standard 1 to 1,000,000 aeronautical map indicated generally at 20. A scale of 1 to 1,000,000 (hereinafter 1000K) means that one linear inch on the map is equivalent to 1,000,000 actual linear inches.

The map scale may be doubled by dividing the dimensions in half, thus forming four equal squares 22, and then expanding each of the areas 22 to the size of map 20. The scale of the expanded area 22 will then be 1 to 500,000 (hereinafter 500K). This means that one inch of the expanded map is equal to 500,000 ground inches. In the same fashion, map sections of increased scale may be formed by halving both dimensions of each section 22, thereby forming sections 24, which, when expanded to the size of may 20, will have a scale of 1 to 250,000 (hereinafter 250K). Sections 24 may be still further subdivided into twenty-five squares 26, the scale of which when expanded to the size of map 20 will be equal to 1 to 50,000 (hereinafter 50K).

Thus, the ground area covered by map 20 on a 1000K-scale will also be covered by four 500K-scale maps, sixteen 250K-scale maps, and four hundred 50K-scale maps. In each scale there is no overlap between adjacent maps. All of the maps are square and have the same over-all dimensions. The individual maps must be prepared and cut to the same predetermined size, but since standard aerial charts and tactical grip maps can be used, this is a relatively easy task.

To insert the map into the plotter for tracking purposes, each map is mounted on a novel map mount shown and described below with reference to FIGURE 7. For the present purposes, it is sufficient to note that the mount, when inserted in the map plotter, informs the control circuitry of the scale of the specific map mounted thereon.

Regardless of the particular scale selected, it is desirable that the user known exactly where he is on map 20, so that when the plotter bug has traveled the limits of the map in use, he will know exactly which of the remaining maps should be next inserted to maintain continuous tracking. For this purpose, each of the dimensions of map 20 is indexed into twenty units corresponding to the 50K map sections 26. Thus, as shown in FIGURE 2, the origin of the map may be considered the lower left hand corner (corresponding to the south west corner of the map) increasing in the northern and eastern directions. For example, consider an aircraft indicated by the dot 28 moving in the direction of arrow 30 across map 20. Dot 28 is located in the 50K map section 26', which would be indentified by the map index 06, 14 (6 units in the north direction, 14 units in the east direction).

As the aircraft continues to move in the direction of arrow 30, it would reach the point 32 which is not within map 26', requiring insertion of the next map to be used. If the same scale were to be maintained, this map section would be the one illustrated at 26'', and would be indexed as 06, 15. In this manner, each of the 50K map sections 26 is indexed so that the navigator, knowing the path along which he has been traveling, and the map index in which he is located, can easily select the next map section which must be employed. If he wishes to change to a smaller scale map, it is only necessary to select the map in that scale which contains the index information corresponding to map section 26''.

In the following description, there are two basic information channels which derive navigational information relative to the north-south and east-west axes, respectively. For purposes of simplicity, a single numeral followed by the letter $y$ or $x$ is used to identify corresponding components in the respective channels, the $y$ referring to a component in the north-south channel and the $x$ to a component in the east-west channel. Hence, components having the same numerals may be considered structurally identical.

Referring now to FIGURE 1, it is assumed for purposes of explanation that a navigational computer is feeding directional information on lines 34y and 36y to a translator 38y. By way of example, the information on line 34y may comprise a train of pulses, each pulse representing a given increment of distance the aircraft has travelled along the north-south coordinate axis. By way of example, the information on line 36y may be a positive voltage when corresponding to north and a negative voltage when corresponding to south, which tells translator 38y to add or subtract the pulses appearing on line 34y.

In like fashion, the pulses on line 34x represent given increments of distance along the east-west coordinate axis, while the polarity of the voltage on line 36x advises translator 38x whether such pulses are to be added or subtracted to determine the east-west component of distance. A doppler radar system manufactured by Canadian Marconi Company can be used to derive these particular inputs.

Translators 38y and 38x, in the preferred embodiment, convert the input position information into a mechanical rotation of shafts 40y and 40x, respectively. Hence, shaft 40y of translator 38y rotates from a predetermined zero point by an amount dependent upon the magnitude of the north-south distance information appearing on line 34y, and in a direction determined by the polarity of the voltage appearing on line 36y. Similarly, the angular displacement and direction of output shaft 40x from its zero position is representative of the aircraft displacement along the east-west axis.

The output shaft 40y of translator 34y is coupled through reduction gears 42y, which are shown as having an $n:1$ reduction, to an output shaft 43y. The purpose of gear reduction 42y is to alter the rotation of translator shaft 40y so that each revolution of the output shaft 43y corresponds to movement of the aircraft along the north-south dimension across the length of a 50K-scale map section 26. the $n:1$ reduction of gears 42x is similarly calculated so that each time the aircraft moves a distance in the east-west direction corresponding to the width of a section 26, output shaft 43x completes one revolution.

The manner in which the particular reduction of gears 42x and 42y is selected will vary depending upon the nature of the input information and the translators 38y and 38x, and will be understood more fully below.

Output shaft 43y is coupled through a 5:1 gear reduction system 44y to a second output shaft 45y which will therefore rotate at one fifth the speed of shaft 43y. This means that each revolution of shaft 45y will correspond to movement of the aircraft across the north-south boundaries of a 250K-scale map section 24. Similarly, a pair of 2:1 gear reduction systems 46y and 48y successively halve the angular velocity of shaft 45y. One complete revolution of shaft 47y will indicate movement across the north-south boundaries of a 500K-scale map section 22. One revolution of shaft 49y corresponds to movement across the entire 1000K map 20. Stated in other words the overall gear reduction system provides four rotating output shafts 43y, 45y, 47y and 49y having angular velocities relates in the same fashion as the selected scales, i.e., 1/50:1/250:1/500:1/1000.

Each of the rotating shafts 43y, 45y, 47y and 49y is coupled to a respective one of four memory devices 52y, 54y, 56y and 58y which store the displacement information for each scale by converting the corresponding shaft rotation to a usable voltage related to the position of the aircraft. Thus, memory device 52y will produce a voltage on its output line 53y which varies linearly as the aircraft moves from the southern to the northern boundary of a 50K-scale map section 26. At the same time, the output line 55y of memory 54y contains a voltage which changes by one fifth of its maximum excursion, indicating that the aircraft has traversed only one fifth of a 250K-scale section 24. The voltage at the output 57y of memory device 56y will vary by an increment of one tenth, and the voltage on the output line 59y of memory device 58y will change by only one twentieth of its maximum excursion. As the aircraft continues to move along the north-south axis, the voltage output of memory device 52y returns to its initial value and then starts to vary again while the remaining voltages continue to change linearly until the aircraft has moved a distance equivalent to the maximum dimension of the corresponding map section. Thus, after five sections 26 have been traversed, the output of memory 54y has completed its total excursion, and so forth. In effect, the voltage outputs of the memory devices 52y, 54y, 56y and 58y are cyclical, the cycle for each memory device corresponding in length to the dimensions of the associated map sections 20, 22, 24 and 26, respectively.

In the identical fashion, memory devices 52x, 54x, 56x and 58x provide voltages which change at different rates, depending upon the associated scale, as the aircraft traverses the east-west axis.

A mechanical counter 60y driven by the output shaft 43y of gear reduction 42y serves as an indicator for the north-south index, and a counter 60x as an indicator for the east-west index. Shaft 43y steps counter 60y once for each full revolution, and since each revolution requires that the aircraft move completely between the north and south boundaries of a given section 26, the count on counter 60y will represent the north-south index as explained with reference to FIGURE 2. Similarly, the count on counter 60x represents the east-west index of FIGURE 2. It may be noted at this time that as long as input information is fed to translators 38y and 38x, counters 60y and 60x will be stepped, so that regardless of the movement of the actual plotter bug, these two indices will always instruct the user which of the various maps should be inserted to track his course.

The four voltages from memory output lines 53y, 55y, 57y and 59y are fed simultaneously to a north-south scale switch 62y which receives a scale control input on line 64y from the map mount causing the scale switch 62y to pass only a voltage from the memory device corresponding to the selected scale. For example, operating on a 50K scale, it is the voltage from memory device 52y which is to control the plotter; therefore, only this voltage will be passed by switch 62y. In an identical manner the east-west scale switch 62x will select one of the east-west memory outputs 53x, 55x, 57x and 59x (which will be 53x in the above example). The control signal from the map mount is applied to switch 62x via line 64x in order to select the proper scale along the east-west axis.

Figure 7:
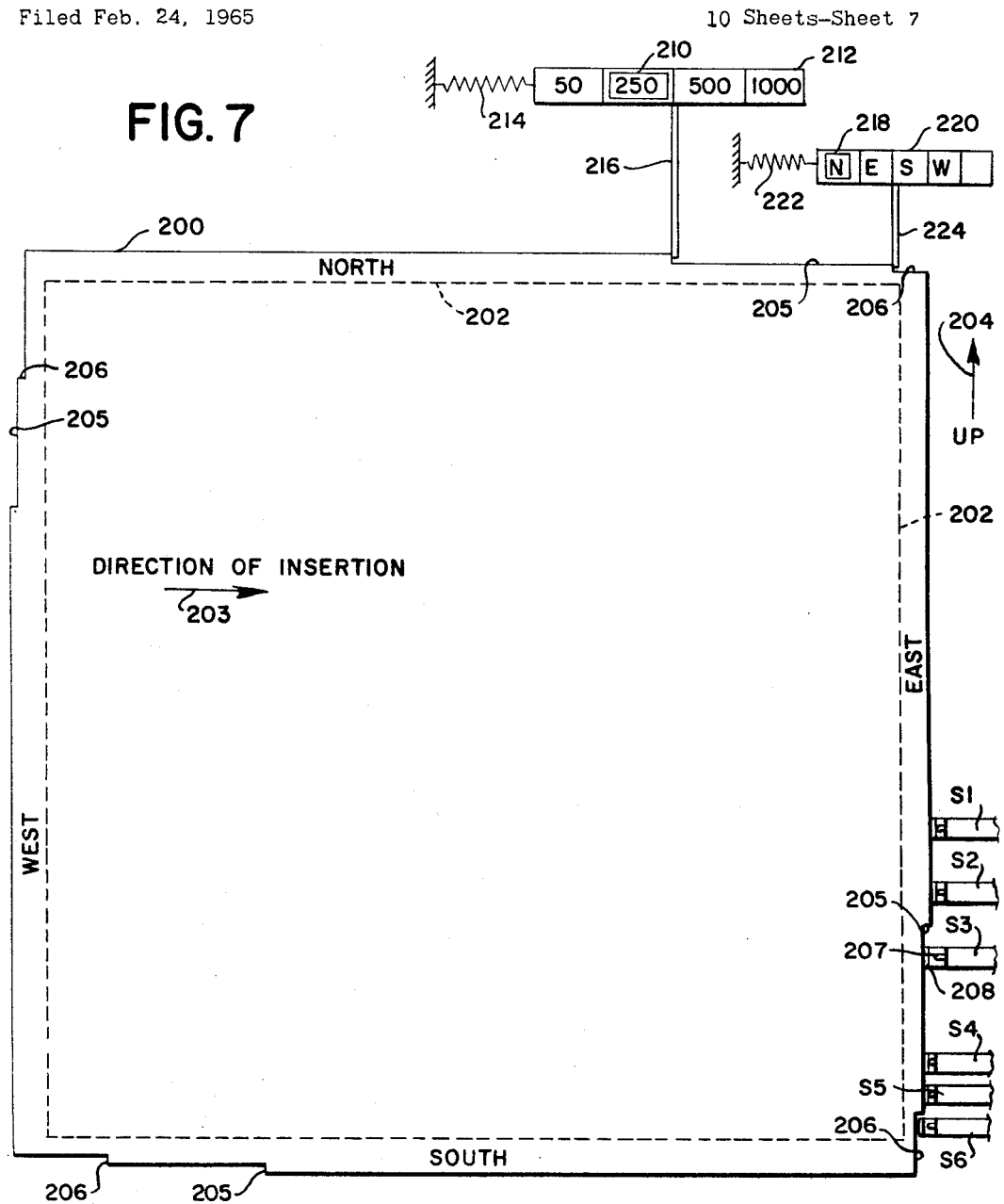
FIGURE 7 is a diagrammatic illustration of a map mount showing the manner in which it actuates the various switches and the scale and track indicating means.

The outputs from north-south scale switch 62y and east-west scale switch 62x are fed together to a track control circuit 66 which is responsive to track signals derived from the map mount of FIGURE 7. These track signals are derived from the map mount and, in effect, inform the control circuitry of the up-direction of the inserted map. In the preferred embodiment, an actuating signal may be considered to exist on line 68 when a map is inserted into the plotter with the east or west direction up.

When a map is inserted with the north or south direction up, the output of north-south scale switch 62y is normally connected by track control circuit 66 to output line 70, which controls the up-down plotter servo 74. The output of east-west scale switch 62x is then coupled through track control 66 to line 72 which controls the left-right plotter servo 76. When a map is inserted with the east or west compass direction up, the actuating signal on line 68 interchanges the outputs of switches 62y and 62x. In this case the north-south distance information stored in the selected one of the memory devices 52y, 54y, 56y and 58y is used to control the left-right servo 76; the east-west displacement information in the corresponding memory device 52x, 54x, 56x and 58x is used to control the up-down plotter servo 74.

The plotting device employed in a preferred embodiment of the invention is driven by the up-down servo 74 and the left-right servo 76, either of which may be responsive to the north-south or east-west directional information, as explained above. Servos 74 and 76, as schematically illustrated in FIGURE 1, are responsive to analog voltage inputs on lines 70 and 72 to cause angular displacements of their respective output shafts 78 and 80 an amount dependent upon the magnitude of the input voltage. Output shafts 78 and 80 operate respective drive chains (not shown) which cause the indicator bug (not shown) to move simultaneously along the up-down and left-right axes to a point representative of the aircraft position.

In order to properly position the bug regardless of the up-direction of the map, it is not sufficient to merely switch the inputs to the servos 74 and 76. It is further necessary to correlate the direction of rotation of shafts 78 and 80 as explained below with reference to FIGURE 3.

In FIGURE 3, a map 86 (of any selected scale) is illustrated with the north direction pointing upwardly. Assume that a plane is moving from point 88 to point 90 along path 92. In such a case, the aircraft will have directional components as indicated by the northward pointing arrow 94 and the eastward pointing arrow 96.

It may be arbitrarily assumed that when a map is inserted into the plotter with the north direction, up and the aircraft has a directional component in the up-direction, it is desired to drive the output shaft 78 of up-down servo 74 in a clockwise direction. It may be further arbitrarily assumed that when the aircraft is moving from left to right (with north up), it is desired to drive output shaft 80 in a clockwise direction.

Now, if the map is inserted with the east direction up, the east-west displacement information is coupled to the up-down translator as explained above. Since the directional component 96 remains from bottom to top (as can be seen by rotating FIGURE 3 ninety degrees so the east direction points upwardly), the up-down translator 74 should continue to drive the up-down plotter in the same direction, i.e., clockwise, even though under the control of directional information along the east-west axis. However, arrow 94 is now pointing from right to left, which is opposite the arbitrarily selected direction required for clockwise operation of translator 76. Therefore, the analog voltage fed to the left-right translator (which is derived from the north-south channel) must cause shaft 80 to rotate in a counter-clockwise direction.

In the same manner it can be shown that when a map is inserted with south up, both translators 74 and 76 must drive their output shafts in a counter-clockwise direction. When the map is inserted with west up, the up-down translator 74 must be driven counter-clockwise and the left-right translator 76 clockwise. This relationship is illustrated in tabular form in FIG. 3B.

For the above purposes, additional track control lines 82 and 84 may be considered to be operatively connected to servos 74 and 76, respectively. When a signal apepars on line 84, left-right servo 76 drives shaft 80 in a clockwise direction, otherwise the shaft will rotate in a counter-clockwise direction. Such a signal occurs when a map is inserted with north or west up. A signal on line 82 causes servo 74 to drive shaft 78 in a clockwise direction when the map is inserted with north up or east up; otherwise the shaft 78 rotates in a counter-clockwise direction. As with the track control signals on line 68, the signals on lines 82 and 84 are derived from the map mount itself as explained in greater detail below.

Since all eight memory devices 52x, y; 54x, y; 56x, y; and 58x, y are continually storing the necessary distance information on the four respective scales, and since the scale switches 62y and 62x are controlled by the map inserted into the plotter, it is possible at any time to switch from one scale to another. The resultant change in scale will immediately produce a different control voltage on the inputs of servos 74 and 76 which will cause the respective output shafts 78 and 80 to immediately position the indicator bug in the proper place on the new map scale.

Furthermore, the track control information on line 68 enables reversal of the north-south and east-west axes, while the track information on lines 82 and 84 will control the direction of rotation of the respective servos 74 and 76.

Thus, regardless of the orientation of the inserted map, the indicator bug will always be traveling across the map on a path corresponding to that of the input navigational data. This means that the navigator can select any desired scale and insert the appropriate map (corresponding to the aircraft position) with any direction up, without making any manual alteration in the control structure of the plotter. Moreover, the navigator is further provided with a continuous indication of the next map which must be inserted, as indexed to the largest scale employed.

A pair of inputs 98y and 98x to translators 38y and 38x respectively provide the capability of manually controlling or slewing the position of the indicator bug. As shown, the slew control may cause rotation of either of the translator shafts 40y and 40x in either direction so that the bug can be positioned at any desired point. The slew control is useful in positioning the indicator bug at a point on the map corresponding to the particular position of the aircraft at a given time. Normally, the slew control is used prior to takeoff, to position the bug at the starting point of the trip, but could be be used to correct minor errors should they appear in the overall system operation.

FIGURES 4A to 4C and 5A comprise a circuit diagram corresponding to the block diagram of FIGURE 1. In the preferred embodiment, the control circuits utilize relays which, for purposes of explanation, are designated with a capital letter. The contacts of a given relay are designated by a corresponding lower case letter with an adjacent distinguishing numeral. In all cases, the relay contacts are illustrated as they exist prior to insertion of a map. By way of example, relay D when energized would cause armature d2 to move from terminal d1 to terminal d3. Of course, all the armatures of a relay are operated when that relay is energized. Wherever possible, the y, x nomenclature of FIGURE 1 is used to designate parts which appear in both the north-south and east-west channels respectively.

FIGURE 4A illustrates the input end of the system including the translators 38y and 38x. The pulse lines 34y and 34x are fed to the common terminals of respective rotary switches 100y and 100x respectively. The switches include rotary contactors 102y and 102x which are ganged together and settable to three positions shown as OFF, SET and RUN. A third rotary switch 104 includes a rotary contactor 106 ganged with contactors 102y and 102x and is coupled to a source of direct voltage to energize the slew control when the switch 106 is placed in the SET position.

Since both translators operate in the identical fashion only the operation of translator 38y is herein described.

A transistor 108y has its base connected to the RUN terminal of switch 100y and its emitter connected to the base of a second transistor 109y. Transistors 108y and 109y comprise a conventional inverter and pulse shaper for the navigational pulses when contactor 102y is set to the RUN position. The polarity signal on line 36y is fed to relay Ay which, for example, will cause transfer of armature a1y from terminal a2y to terminal a3y when the voltage on line 36y is negative.

The actual translation of input distance signals to a displacement of shaft 45y is accomplished by means of a stepper motor indicated generally at 112y, which is driven by a control unit 110y. Preferred constructions of these parts (and other components of the invention) are given below at the end of the specification. Motor 112y includes field windings 114y and 116y which are connected to the control unit 110y. The control unit 110y is a logical device which will energize field coils 114y and 116y to rotate output shaft 40y in a clockwise or counter-clockwise direction depending upon whether the collector of transistor 109y is connected to terminal a2y or a3y by energization of relay A.

As explained above, the relatively rapid stepped rotation of shaft 40y is reduced by gear reduction 44y so that output shaft 45y will make one complete revolution when the aircraft travels a distance equivalent to the north-south dimension of a 50K-scale map section 26.

The slew control comprises an oscillator and pulse shaper 118, the input of which is connected to the SET terminal switch 104. The output of the oscillator and pulse shaper 118 is connected to a common terminal of two normally open switch armatures 120y and 120x having stationary N, S terminals and E, W terminals, respectively. These terminals are in turn connected to the clockwise and counter-clockwise controls of control units 110y and 110x.

When contactor 106 is placed in the SET position (removing the inputs from transistors 108y and 108x), the oscillator and pulse shaper 118 is energized, whereby manually throwing switches 120y and/or 120x to either of the illustrated positions will cause the associated control unit 110y or 110x to drive the stepper motor 112y or 112x in a certain direction. In practice, the slew switch 120y and 120x may comprise a single common armature which may be thrown into engagement with any of the four stationary terminals arranged in quadrature around the common armature. In this fashion, the rotation of output shafts 45y and 45x can be manually controlled, providing the capability of positioning the indicator bug at any desired place on the map.

The scale memory devices are illustrated in FIG. 4B. Since the reduction gears and counters are all well known, they are again illustrated in schematic form. All eight memory devices 52x, y; 54x, y; 56x, y; and 58x, y are identical, and only one, 52y is described in detail.

Each memory device comprises a continuous 360-degree potentiometer 122 having a rotary wiper arm 124. The potentiometer is connected across a pair of terminals 126 and 128 to which a source of alternating voltage is connected. The center tap 130 of each potentiometer is grounded. The rotary wiper arm 124 is electrically connected to memory output line 53y and mechanically coupled to the output shaft 43y, as schematically indicated. For reasons of economy and simplicity it is generally preferred to use an alternating voltage to drive the plotter bug; therefore, an alternating voltage is placed across each of the potentiometers. In this case, the voltage on the memory output lines will undergo a phase reversal after the wiper arm 24 passes the center tap 130. However, the sine wave appearing on the output will have the same effect as a linearly increasing or decreasing voltage as far as the servo itself is concerned, which, conventionally, operates around its null point for purposes of linearity.

As explained above, with reference to FIG. 1, each of the wiper arms 24 of the various memory devices 52x, y;

54x, y; 56x, y; 58x, y will rotate at an angular velocity dependent upon the particular output shaft to which it is coupled (and therefore to one of the four selected scales). Hence, the voltages on the eight output lines 53x, y; 55x, y; 57x, y and 59x, y will vary linearly from a "positive" maximum to a "negative" maximum in a cyclical fashion corresponding to movement of the aircraft across the respective map sections 20, 22, 24 and 26.

FIGURE 4C is the circuit diagram corresponding to the scale switches 62y and 62x, the track control 66, and the servos 74 and 76 of FIGURE 1. FIGURE 5A shows the manner in which the various control relays are energized, while FIGURES 5B and 5C illustrate how the contacts of the various relays effect the control operation. In certain cases it may not be feasible to use a single relay to operate the number of required contacts, but for purposes of explanation a single relay is shown in each case.

As far as the relays are concerned, the nomenclature remains as discussed above. The energization of the relays is initiated by miniature, high precision, snap action switches known as "micro-switches," and such switches are designated by the letter S followed by a numeral 1 to 11. To distinguish the switches from the relay contacts, the stationary contacts of the switches are shown as small vertical arrows. The switches are all illustrated in their non-actuated position, i.e., before a map is inserted, and since they are snap action switches, when the actuating force is removed from a switch, it will return to the illustrated position. The switches are normally available as single-pole double-throw switches, but since in certain cases they are used as single-pole, single-throw switches, they are so illustrated in such cases.

For the present purposes, it is sufficient to note that various combinations of switches S1 through S6 (FIG. 5A) are actuated when a particular map mount is inserted into the plotter. The actuation of switches S1, S2 and S3 is dependent upon the scale of the inserted map, while the actuation of switches S4, S5 and S6 is dependent upon tracking i.e., the up-direction. Thus, the contacts of relays B and C control the operation of the scale switches 62y and 62x, while relays D, F and G operate the track control 66 and the servos 74 and 76.

The manner in which the relays B, C, D, F, and G are operated by the switches S1 to S6 of FIGURE 5A may be readily understood by reference to the adjacent tables of FIGURES 5B and 5C wherein an X indicates actuation of the switches S1 through S6 and energization of the respective relays. For example, if the scale of the inserted map is 250K, switches S1 and S2 are actuated, applying a direct voltage to relay B while simultaneously removing the voltage from relay C. Thus, FIGURE 5B further shows that relay C is operated if the scale is 500K or 50K, and that both relays B and C are de-energized if the scale is 1000K.

As to tracking, as shown in FIG. 5C, if the map is inserted with north up, switches S4 and S5 will be actuated energizing relays F and G, but not D. If east is up, switch S4 alone is actuated to energize relays D and F through the normally closed contacts of switches S5 and S6. When south is up, none of the relays D, F and G are energized; closure of switches S4 and S5 and S6 when west is up energizes relays D and G.

With this in mind, the operation of the control circuits of FIGURE 4C may be readily understood. Relay C operates four double-pole contacts, and relay B operates two double-pole contacts. The relay contacts are arranged in two tree-type switching arrangements so that depending upon the operation of the respective relays, one of the lines 53y, 55y, 57y and 59y will be connected to the output terminal b2y and the corresponding one of the east-west scale lines 53x, 55x, 57x and 59x will be connected to the east-west output terminal b2x. By way of example, and referring back to the table of FIGURE 5B, if the 250K scale is selected, relay B alone is energized. In this case, line 55y (corresponding to the 250K scale) will be connected through the normally closed contacts c4y and c5y and the operated contacts b3y and b2y to the output. Each other channel will be opened by one of the two relays B and C. Similarly, line 55x will be connected through contact c4x, armature c5x and closed contact b3x to output terminal b2x.

In like fashion, it can readily be shown that depending upon which of the switches S1, S2, and S3 are actuated, a selected pair of the memory output lines 53x, y; 55x, y; 57x, y; 59x, y will be coupled through the scale switches to present alternating analog voltages identifying the aircraft position along the north-south and east-west axes on the selected scale.

The track control 66 comprises two single-pole double-throw contacts of relay D, and, as explained above, functions to reverse the north-south and east-west axes when the map is inserted with east or west up. In their normal positions armatures d2 and d5 contact terminals d1 and d4, respectively, to couple the north-south position data to up-down servo 74, and the east-west position data to left-right servo 76. However, when relay D is energized by closure of switch S4 when east or west is up, relay armatures d2 and d5 are operated to terminals d3 and d6, respectively. This connects the east-west output on armature b2x to up-down servo 74 via d3y, d2y, and the north-south output on armature b2y to the left-right servo 76 via d6x, d5x.

The following description pertains to preferred constructions of servos 74 and 76. It should be obvious that the particular positioning or servo means employed is not an element of the invention. Moreover, although A.C. operation is specifically illustrated, the principles of the invention are equally applicable to D.C. control.

The up-down servo 74 includes a summing resistor 131 coupled to the input of a conventional A.C. servo amplifier 132. The output of amplifier 132 is coupled through contacts f1 to f6 to the drive input of servo motor 134. The rotation of the output shaft of motor 134 is suitably reduced by gears 136, and the output thereof employed to position the rotary wiper arm 140 of a continuous feedback potentiometer 138. The rotation of shaft 137 is further reduced by suitable gears 144 from which the output shaft 78 extends into direct engagement with the plotter bug (not shown). As described below, shaft 78 positions the bug along the up-down axis of the visible map display.

The wiper arm 140 is electrically coupled by a negative feedback line 142 to a summing resistor 143 connected to the input of amplifier 132 and equal in resistance to resistor 131. Potentiometer 138 is the same as the memory potentiometers 122 (FIGURE 4B), and the rotary arm 140 will follow the movement of whichever memory wiper arm 124 is coupled to summing resistor 131 by the scale switches 62y, x and track control 66. The voltage across summing resistor 143 is therefore dependent upon the displacement of output shaft 137 (and hence the position of the indicator bug), whereby the output of amplifier 132 is an error voltage dependent upon the difference between the actual bug position and the corresponding aircraft position.

To operate the motor a pair of control leads 146 and 147 are connected to a source of alternating voltage on terminals 148 and 150 via relay contacts f7 to f12. In a known fashion, transfer of armatures f8 and f11 to contacts f9 and f12 enables reversal of the direction of rotation of motor 134.

With the exception of the introduction of relay F, the operation of the servo loop above described is conventional. Under normal circumstances, i.e., with a positive voltage on line 145 and the contacts of relay F as shown, the motor will drive the output shaft 78 in one direction e.g., counterclockwise. However, when relay F is operated, the transfer of armatures f2, f5, f8 and f10 will, in a known manner, cause rotation of shaft 78 in the opposite or counter-clockwise direction.

The construction and operation of servo 76 is virtually identical to that described above with respect to servo 74, and corresponding parts are indicated with the identical call-out numeral followed by a prime mark ('). Instead of the contacts of relay F, however, the contacts of relay G are inserted, but they have the same effect on the output rotation of shaft 80. Thus, referring to the table of 5C, relay G is energized when a map is inserted with north up, and when a map is inserted with west up. Hence, shaft 80 will rotate in one direction, say clockwise, under these cirsumstances, and in the other direction, or counterclockwise, when a map is inserted with east or south up. Also, as described below, shaft 80 positions the plotter bug along the left-right (instead of up-down) axis of the map display.

When the direction of rotation of shaft 78 (or 80) is to be changed for tracking purposes, it becomes also necessary to reverse the phase of the alternating voltage across feedback potentiometer 138 (or 138'), thus altering the reference voltage across resistor 143 (or 143'). Accordingly, an alternating voltage appearing on terminals 152 and 154 is coupled across the feedback potentiometers 138 and 138' with a phase dependent upon the direction of rotation of the output shafts 78 and 80, respectively. Since these directions are determined by the contacts of relay F and G, additional contacts of these relays are inserted between the terminals 152 and 154 and the respective feedback potentiometers 138 and 138'. Hence, contacts $f13$ to $f18$ will reverse the phase across potentiometer 138 at the same time that contacts $f1$ to $f12$ reverse the direction of rotation of shaft 78. Similarly, contacts $g13$ to $g18$ reverse the phase across feedback resistor 138' depending upon the direction of rotation of shaft 80.

The above explanation correlates with that given above with respect to FIGURES 3A and 3B, in describing the manner in which the direction of rotation of output shafts 78 and 80 is controlled to assure proper tracking regardless of the orientation of the inserted map.

The servo system as above described assures that the plotter bug will always be positioned in the proper place on the map and moving along the correct track at a rate dependent upon the selected scale. When the plotter bug reaches an edge of a map, the operatively connected memory wiper arm 124 will be at a maximum "negative" level. As the wiper arm continues to move in the same direction, the voltage on its corresponding output lines will effectively switch from a maximum "negative" level to a maximum "positive" level, i.e., will reverse phase.

When this phase reversal is applied to summing resistor 131 (or 131') it appears as a voltage equal in magnitude but opposite in phase to the voltage across feedback resistor 143 (or 143'). This is the maximum possible voltage difference, and, assuming that the scale remains unchanged, will drive motor 134 (or 134') so as to reverse the direction of rotation of output shaft 78 (or 80) whereby the plotter bug is moved to the other far edge of the map and is placed in position to commence tracking on the next successive map.

At all times (as long as there is input positional data) an error voltage is fed to the two servos and since, when no map is inserted, lines 59y and 59x are normally connected to the up-down and left-right servos 74 and 76, respectively, the plotter bug will be positioned at a 1000K scale rate even though there is no map in the display. This is equivalent to a memory, since it means that at any time after the bug has been initially positioned (the plotter having been continually running), and the proper map is inserted, regardless of its scale and its selected up-direction, the plotter bug will immediately be positioned with respect to the inserted map at a location corresponding to the aircraft position.

It is desirable to turn off the plotter motors 134 and 134' when the plotter bug has traveled off the particular map in use. Otherwise, the bug would be recycled erroneously over the map in use, possibly causing serious navigational errors. For this purpose, there are provided four limit switches S8, S9, S10 and S11 which are connected in series between a common motor terminal 145 and a source of positive voltage. Motors 134 and 134' cannot operate when this voltage supply is removed from terminal 145 and therefore when one of the switches S8 to S11 opens, the motors are both turned off. As explained more fully below, the four switches are arrayed along the respective sides of an inserted map in such a fashion that they are actuated when the plotter bug reaches the corresponding edge of the map in the display.

After the plotter bug has been stopped, it is necessary to move the bug to the proper position on the map which is next inserted. Therefore, it is necessary to by-pass or reset the actuated limit switch S8, S9, S10, or S11 when the "pinned" map is removed. For this purpose, relay H is connected in series with a normally closed snap action switch S7. The contacts $h1$ and $h2$ are normally closed (i.e., when a map is removed or no map is inserted) and are connected in parallel across limit switches S8, S9, S10, and S11. S7 is opened when a map is inserted, de-energizing relay H and closing a bypass circuit through contacts $h1$ and $h2$. Since, when no map is in place, the motors 134 and 134' are controlled by the 1000K data on lines 59y and 59x, respectively, it is this scale information which will cause operation of motors 134 and 134' when a map is removed. This, in turn, removes the actuating force from the opened limit switch, allowing it to close and applying the operating voltage to terminal 145 whereby normal operation can continue. Thus, when the next map is inserted, opening switch S7 and contacts $h1$ and $h2$, the motors 134 and 134' can once more be operated in their normal fashion. Similarly, if it is desired to manually slew the "pinned" bug, contactor 106 is placed in the SET position, and the map already in the plotter is removed, opening switch S7, and closing the by-pass circuit through contacts $h1$ and $h2$.

FIGURE 6 illustrates schematically the control of the plotter bug to manifest the aircraft position, and the actuation of limit switches S8 to S11.

Gears 144 and 144' coupled to the respective output shafts 78 and 80 are the same as those illustrated in FIGURE 4C. Both of the output shafts 78 and 80 are coupled to respective chain drives illustrated schematically at 156 and 158. A thin transverse cross hair 160 is secured to chain 156, and similar cross hair 162 is connected to chain 158. At the intersection of cross hairs 160 and 162 the annular bug 164 is slidably positioned.

The construction above described is conventional. When shafts 78 and 80 drive chains 156 and 158, the cross hairs 160 and 162 are positioned so that the intersection corresponds to the aircraft position. This will be apparent to those skilled in the art, since, as explained above, the angular displacement of one of shafts 78 and 80 from its zero position is always representative of the aircraft displacement along either the north-south or east-west coordinate, angular displacement of the other shaft representing the aircraft displacement along the other coordinate.

The respective limit switches S8, S9, S10 and S11 are indicated with the same nomenclature used in FIGURE 4C. These switches are standard snap-action limit switches, and include a plunger 170 which, when depressed by an elongated actuator 172, will transfer a spring biased common contact from a normally closed stationary terminal to a normally open terminal. When the actuating force is removed, the common contact will return to the normally closed terminal. To actuate the limit switches, short transverse bars 166 and 168 are rigidly secured to chains 156 and 158 in any desired manner. Bars 166 and 168 are secured to the chains at the same location as the respective cross hairs 160 and 162, but on the opposite sides of the chains.

The switches S8 and S9 are arranged at the top and bottom, respectively, of the display so that when the cross hair 160 (and thus indicator bug 164) reaches the end of the map 155 in either of these directions, bar 166 will depress actuator 172 (or 174) to actuate the associated limit switch. In the same fashion, limit switches S10 and S11 are arranged to the left and right, respectively, of the map display so as to be actuated by bar 168 when cross hair 162 reaches either side of the display.

It is to be understood that FIGURE 6 is merely a schematic illustration of a preferred construction utilizing standard practice in the art. As to this particular feature of the invention, it is only necessary that one of the limit switches be actuated when the indicator bug 164 has traveled as far as it should on a particular map. Obviously, there are numerous mechanical arrangements which can readily achieve this particular objective.

Referring now to FIGURE 7, the map mount which controls the scale and tracking of the invention is shown generally at 200. The map mount is a thin rigid plate, preferably of plastic, sturdy enough to actuate the necessary switches and to hold the maps so that they can be conveniently inserted into the plotter. A map will occupy the area shown in dotted lines at 202 and is secured to the map mount 200 so that the actual directions on the map correspond with the compass directions printed on the four sides of the map mount. As explained below, the map is inserted into the plotter in the direction of arrow 203, and the up direction as observed by the navigator will be in the direction of arrow 204.

Each of the edges of the map mount 200 includes a long and short notch 205 and 206, respectively, which serve to actuate the scale switches S1, S2, S3, and the tracking switches S4, S5, S6. For purposes of clarity, the switch nomenclature has been maintained although they are here illustrated diagrammatically. Each of these switches includes a plunger 207, which, when depressed by an elongated actuator bar 208, will operate the switch contacts illustrated in FIGURE 5A. In the illustrated embodiment, the long notch 205 cooperates with switches S1, S2 and S3 for purposes of scale determination, while the short notch 206 cooperates with switches S4, S5, S6 to control the tracking.

The manner in which the mount controls the switch operation can be best understood with the use of a specific example in which a 250K map is inserted with north up, although obviously, this feature of the invention is not limited to any specific dimensions. In this example, the long notch 205 extends for a distance of two inches if the map mount is to be used with 250K scale maps. Referring to 5B, for a 250K scale, it is necessary that switches S1 and S2 be actuated and that switch S3 be unactuated. Thus, these three switches are arranged with respect to this two inch notch so that when the map is inserted in the direction of arrow 203, an edge of the map mount will actuate switches S1 and S2 but not switch S3. Since the scale remains the same regardless of the up direction, the long notch 205 on each edge of the mount should be the same or equal to two inches in the present case. With these particular dimensions, it is convenient to use half inch increments for the scales, so that for a 50K scale map mount the long notch would extend one and a half inches whereby the map mount would actuate all three switches S1, S2 and S3 as required by FIGURE 5B, Similarly, 500K scale would require a notch of two and a half inches (thereby actuating only switch S1), while the 1000K scale would require a notch of two and a half inches preventing actuation of any of the switches.

In the case of the tracking information, different combinations of switches S4, S5 and S6 must be actuated by each map mount depending upon the selected up direction. For example, in the present example (with north up), it is the east edge of the map mount which actuates the tracking switches S4, S5 and S6. Referring to FIGURE 5C, with north up, switches S4 and S5 must be actuated, while switch S6 is not actuated. If the tracking or short notch 206 extends for one half inch along the east edge, with the switches S4, S5, S6 approximately one-fourth of an inch apart, the necessary control can be readily obtained. Thus, the notch 206 along the south side extends three-fourths of an inch; the notch 206 along the west side one inch and the notch 206 along the north side one-fourth of an inch.

Hence, if the map is inserted with east up, the three-fourths-inch notch 206 along the south side of the map mount will only actuate switch S4 which is the case required by FIGURE 5C. If south is up, the one-inch-notch on the west side will prevent actuation of any of the three switches, but if west is up, the quarter-inch-notch on the north side will actuate all three switches. In this fashion the opening and closing of switches S1, through S6 of FIGURE 5A and the subsequent control of the map plotter as explained with reference to FIGURES 4A, 4B, and 4C, is obtained.

An additional feature of the invention is schematically illustrated in FIGURE 7, an permits the user to observe the scale of the selected map as well as the up direction. For this purpose, the outer case of the map plotter will include a small window 210 beneath which an indicator strip 212 is mounted for slidable movement. Indicator strip 212 contains thereon indicia of the map scales employed, and is spring-biased by a spring 214 so that when the map is withdrawn the 1000K scale indicia appears in window 210. A connecting rod 216 is connected to strip 212 and extends towards the map mount a sufficient distance to engage the edge of the long notch in each side which sets the scale. The various components are positioned in an obvious manner so that when the map mount 200 is fully inserted into the map plotter, the long notch 205 will push the actuator bar 216 a sufficient distance to cause the appropriate scale indicia to appear in window 210. In the illustrated example, the two-inch notch causes scale indicia "250" to appear.

The tracking indicator operates in the same fashion and includes a window 218 beneath which a tracking indicator strip 220 slides. Slide 220 is biased by spring 222 and a connecting rod 224 engages the short notch 206 in each side. Again the parts are properly arranged so that the suitable indicia will appear in window 218 when the map is inserted. As illustrated, the one-fourth-inch notch in the east side of the mount, when north is up, will cause the "N" to appear in window 218. When the map is removed, the blank space to the right of the letter "W" will appear in the window.

One of the outstanding features of the present invention is its adaptability to almost any conceivable type of input. For example, as to the specifically illustrated embodiment of FIGURES 4A, 4B and 4C, any type of input could be used which could be converted into a shaft displacement proportional to distance. Thus, in the illustrated embodiment, the electrical input could be a velocity signal which is subsequently integrated, or an acceleration signal which is integrated twice. Moreover, the signal may be in analog or digital form, or it may be a signal modulated in any manner. If position data is available as shaft displacements, such shafts may be coupled directly to shafts 40y and 40x, bypassing translators 38y and 38x.

Also, the specific analog instrumentation illustrated in the preferred embodiment may be replaced by digital techniques for storing displacement information, scale switching and track switching. Digital servo techniques may be employed to position the bug.

Figure 8:
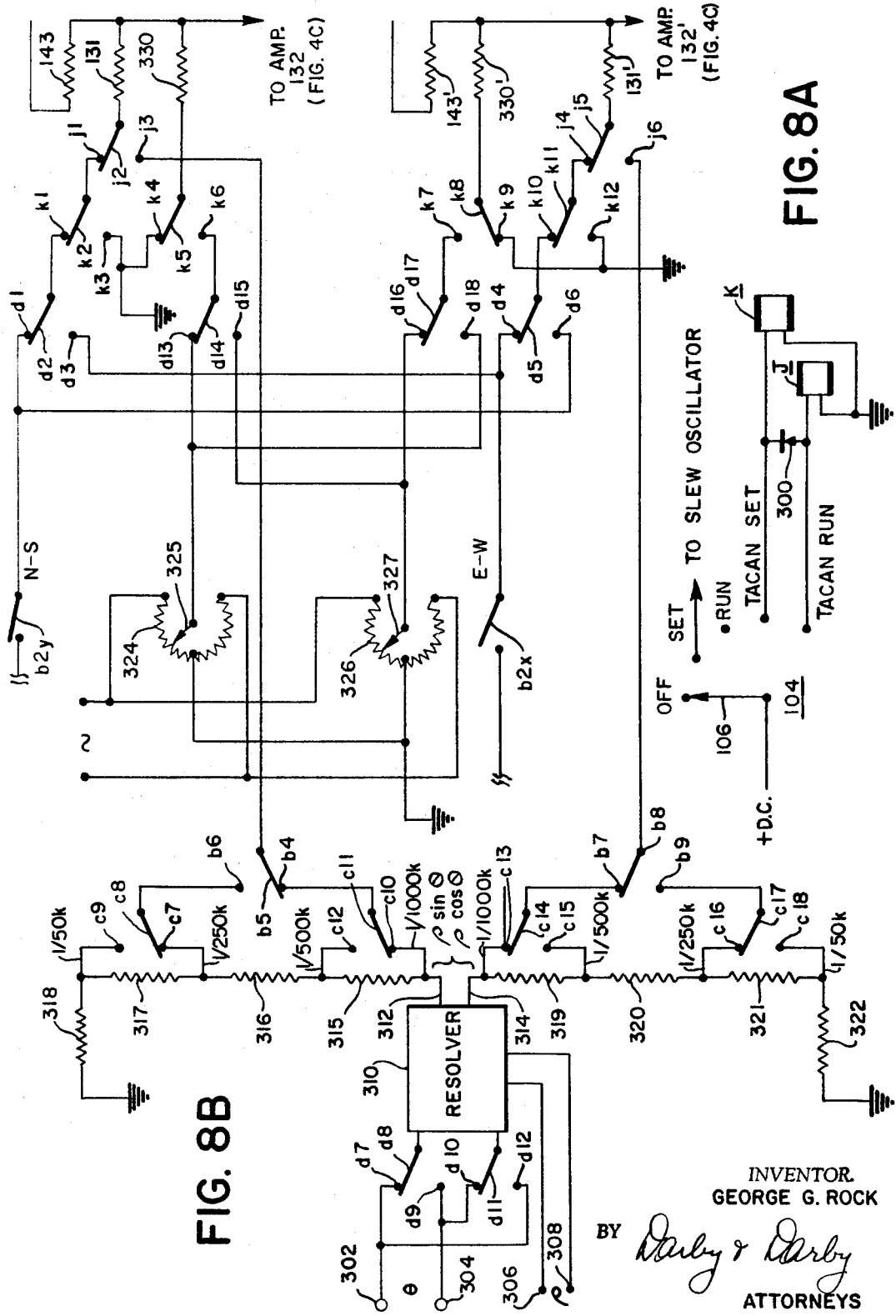
FIGURES 8A and 8B are circuit diagrams showing how the preferred embodiment of the invention may be modified to operate from a Tacan input.

FIGURES 8A and 8B illustrate an embodiment of the invention which dispenses with substantially the entire input and memory structure of FIGURES 4A and 4B, and in which there is no translation of input data into shaft displacement.

Since the invention may readily include the capability of selecting one of a plurality of distinct modes of operation, this embodiment is shown as an addition to the circuits of FIGURES 4A, 4B and 4C. Where a component is used in both embodiments the same reference numeral is maintained, and, to avoid unnecessary repetition, only those portions of the circuit which are different are illustrated in FIGURES 8A and 8B.

The embodiment of FIGURES 8A and 8B is responsive to "TACAN" navigational information wherein the data arrives in polar coordinates, i.e., range ($\rho$) and bearing ($\theta$). The data is transmitted from a TACAN station and received and processed at the aircraft in a conventional manner to provide range and bearing information.

FIGURE 8A illustrates the only changes required in FIGURE 4A wherein two additional stationary terminals labelled TACAN SET and TACAN RUN have been added to the switch 104. Two relays J and K are connected to the TACAN RUN and TACAN SET terminals, respectively, of switch 104. Relays J and K have a common ground terminal and a diode 300 is connected across the other ends of the relay coils as shown, so that when wiper arm 106 contacts the TACAN RUN terminal, both relays J and K are energized. In the TACAN SET position, diode 300 blocks passage of the positive voltage to relay J and only relay K is energized.

Since this particular embodiment does not include a mechanical displacement, FIGURE 4B remains completely unchanged, and in the TACAN mode will be out of the circuit.

Referring to FIGURE 8B, the bearing information appears on terminals 302 and 304 while the range information appears on terminals 306 and 308. It is recalled that relay D is effective to reverse the east-west and north-south axes with respect to the servos 74 and 76. This particular embodiment of the invention requires further sets of contacts on relay D, and as shown, relay contacts $d7$ to $d12$ are interconnected between the bearing terminals 302 and 304 and a conventional resolver 310. The purpose of the resolver is to convert the range and bearing information appearing in polar co-ordinates to rectangular co-ordinates, which requires conversion of $\rho$ and $\theta$ to $\rho \sin \theta$ and $\rho \cos \theta$ at the output of resolver 310, corresponding to rectangular $y$ and $x$ co-ordinates, respectively. Such a resolver is conventional.

When relay D is energized the $y$ and $x$ transformations are caused to be reversed on the output lines 312 and 314. In other words, when bearing terminal 302 is coupled to resolver 310 through contacts $d7$ and $d8$, and terminal 304 is coupled through contacts $d10$ and $d11$ to resolver 310, $\rho \sin \theta$ (i.e., "$y$") will appear on output line 312, while $\rho \cos \theta$ (i.e., "$x$") appears on output line 314. When relay D is energized applying terminal 304 through contacts $d9$ and $d8$ to resolver 310, and terminal 302 through contacts $d12$ and $d11$ to resolver 310, $\rho \cos \theta$ appears on output line 312 with $\rho \sin \theta$ on output line 314. This then in effect provides the equivalent of the axes reversal achieved by contacts $d1$ through $d6$.

The voltages appearing between lines 312 and 314 and ground are alternating voltages, the magnitudes of which are proportional respectively to the corresponding north-south and east-west components of distance. These voltages should correspond to the largest map scale, i.e, 50K in the preferred embodiment. In this case, for scaling purposes, four resistors 315, 316, 317 and 318 are series-connected across line 312 to ground. Similarly, four resistors 319, 320, 321 and 322 are connected across line 314 to ground. When these resistors are properly correlated in known manner the voltage drops caused thereby will produce voltages at their respective junctions which correspond to the desired scales. Other impedance elements or transformers could also be used in place of these scaling resistors.

The output voltages on lines 312 and 314 do not vary cyclically in the same manner as described above. Here, the voltages continue to change in magnitude as the aircraft continues to move away from the TACAN transmitter station. Since the resistors are connected in series, each scale control voltage will increase at a different rate but in a continuous fashion.

To select the desired scale voltage, the contact arrangement of the relays B and C shown in FIGURE 4C may be duplicated. These additional relay contacts are shown as $b4$ to $b9$ and $c7$ to $c18$. In the illustrated contact positions, the 1000K-scale voltage will be coupled to the output terminals $b5$ and $b8$. When relays B and C are energized in accordance with the table of FIGURE 5B, the voltages at the different junctions of the resistors will be coupled to the terminals $b5$ and $b8$ depending upon the selected scale.

Output contacts $b5$ and $b8$ are coupled to contacts $j3$ and $j6$ respectively which are normally open. However, when operating in the TACAN mode, wiper arm 106 of switch 104 (FIGURE 8A) is in the TACAN RUN position, energizing relay J and transferring contacts $j2$ and $j5$ to $j3$ and $j6$, respectively. Thus, the resolver output voltage, scaled to the selected map, is applied to the summing resistors 131 and 131', respectively, from which point the operation of the servos 74 and 76 in positioning the bug is the same as that described above. For this reason the remainder of the servo circuitry is not illustrated in FIGURE 8B.

When operating in the TACAN mode the navigational information is derived from a fixed point on the map. This point must be identified and its coordinates "memorized" by the plotter so that the proper reference point is maintained. Potentiometers 324 and 326, including rotary wiper arms 325 and 327, respectively, are employed for this purpose. These potentiometers are connected in parallel across a source of alternating voltage with their center taps grounded in the same manner as the memory potentiometers described above. Wiper arms 325 and 327 are connected to six further contacts of relay D shown as $d13$ to $d18$ exactly as the outputs of the scale switches $62y$ and $62x$. Contacts $d14$ and $d17$ are adapted to be connected to additional summing reservoirs 330 and 330', respectively, when the set relay K is energized, transferring armatures $k5$ and $k11$ to contacts $k6$ and $k12$, respectively.

As in the previous embodiment, the purpose of the contacts of relay D is to interchange the north-south and east-west axes for tracking purposes. Therefore, further discussion of the operation of contacts $d13$ to $d18$ is deemed unnecessary. As illustrated, potentiometer 324 controls the north-south component and potentiometer 326 the east-west component of the bug position.

The operation of the potentiometers 324 and 326 may be clearly understood by reference to a specific example. Assume that the contacts $d14$ and $d17$ are in their illustrated positions. The navigator will then move wiper arm 106 to the TACAN SET position energizing relays J and and K. Wiper arms 325 and 327 are then connected to summing resistors 330 and 335, respectively, through contacts $k5$ and $k8$. At the same time, the input to summing resistors 131 and 131' is opened by contacts $k2$ and $k11$, respectively. Furthermore, since relay J is not energized in the TACAN SET position, the resistors 131 and 131' are grounded through contacts $j2$ and $j5$.

Wiper arms 325 and 327 are then manually moved so that the plotter bug is positioned by the servos 74 and 76 directly above the TACAN transmitter station. Now, when the rotary wiper switch 106 is placed in the TACAN RUN position, relay J is energized along with relay K. As explained previously, this places the TACAN input (converted to rectangular coordinates) on the appropriate summing resistors 131 and 131'. Since the servos will already have been nulled by the TACAN SET positioning, the plotter bug will then be positioned by the servos to the proper point relative to the TACAN transmitter. In effect then, the potentiometers 324 and 326 (the reference outputs of which remains coupled to the two plotter servos through resistors 330 and 331) provide a reference point for the servos as long as the device is operating in the TACAN mode.

Figure 9:
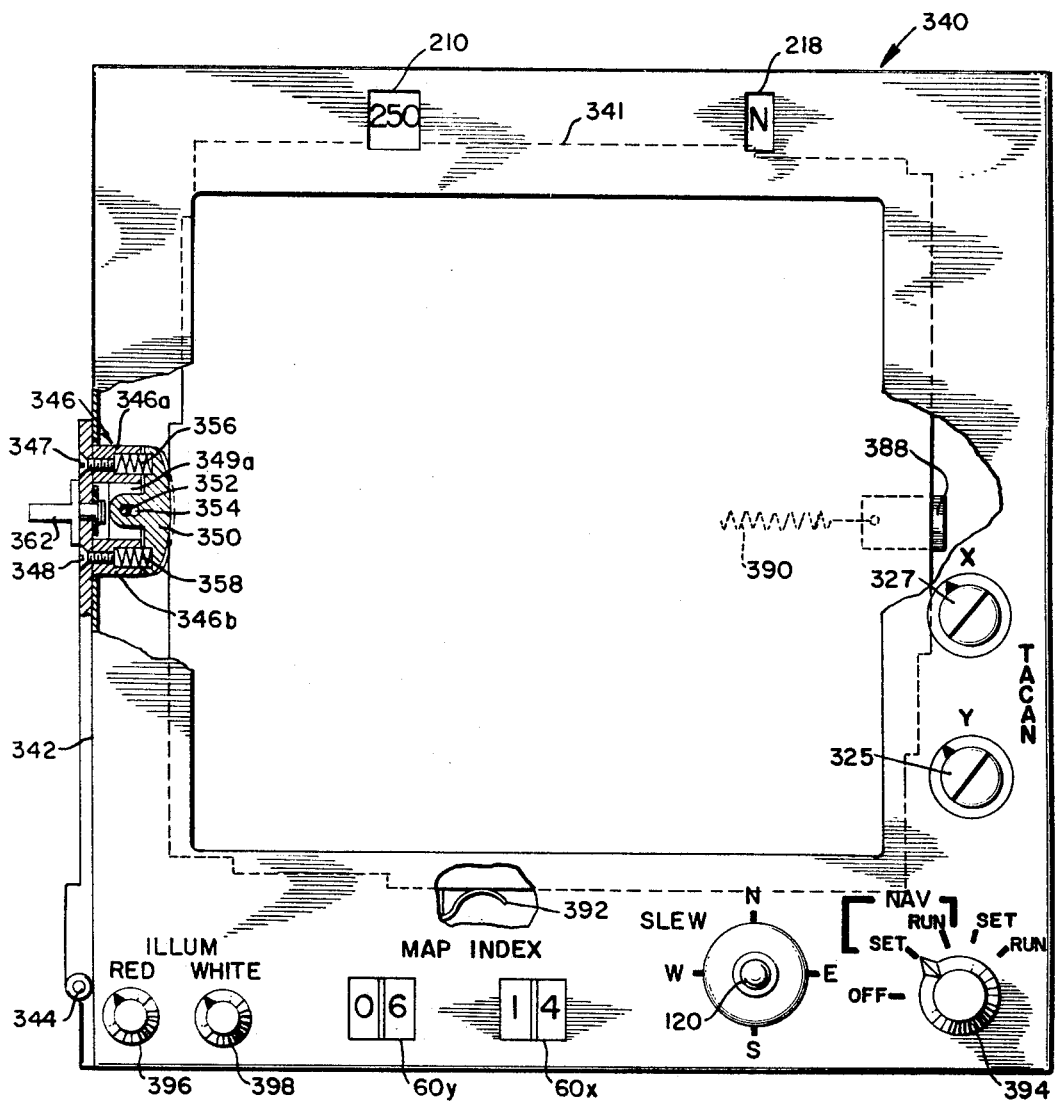
FIGURE 9 is a plan view, partially in section, showing the apparatus used to insert and hold the maps and the control panel of the plotter.

FIGURES 9 and 10 illustrate the appearance and certain structural details of a map plotter display embodying the principles of the invention. In this instance, the map plotter includes the capability of receiving the position inputs of both of the above described embodiments. Wherever possible, the same reference numerals are used to illustrated the mechanical counterparts of the previously described constructions.

The map plotter display case is shown generally at 340 relative to an inserted map mount 341. An elongated arm 342 is pivotally mounted to case 340 by hinge member 344, and a mounting block 346, is secured to the upper end of arm 342 by respective screws 347 and 348. Block 346 consists of two legs 346a and 346b connected by two spaced apart horizontal strips 349z and 349b. As illustrated, there is a space between strips 349a, 349b and arm 342.

A curved retainer yoke 350 is pivotally mounted on pin 352 which passes through an elongated aperture 384 in yoke 350. Two coil springs 356 and 358 are mounted in suitable bores within the block 346 to bias the yoke 350 into the map plotter case 340. The yoke 350 may thus be pivoted and moved longitudinally to a slight extent. This provides a particularly advantageous structure for inserting the map, since it causes the applied force to be directed generally transverse to the plotter itself.

As shown in FIGURE 10, the yoke includes a V-shaped notch 360 which receives an edge of the map mount 341. A knob 362 is fixed to a thin key 364 so that when the map mount 341 is fully inserted into the case 340, knob 362 can be turned causing locking engagement of key 364 with the adjacent lip 366 of the map plotter case.

The map mount, when inserted, will slide on suitable trackways (not numbered) in the casing and cooperates, at its right end, with a return plate 388 which is spring-biased by coil spring 390 toward the locked arm 342. Thus, when key 364 is pivoted out of a locking engagement with lip 366, coil spring 390 causes return plate 388 to push the map mount 341 out of the case 340 to facilitate its removal.

The scale window 210 and the tracking window 218, illustrated in FIGURE 7, are shown at the top of the map mount of the map plotter. The map index, including the counters 60y and 60x of FIGURES 1 and 4A, is located at the bottom of the casing. The slew control switch 120 is shown as a single bat handle with four possible positions corresponding to the description of FIGURE 4A. It will be obvious to those skilled in the art that handle 120 can serve the combined functions of switches 120y and 120x.

Since this construction includes the capability of responding to TACAN derived signals, the switch 394 includes five positions and corresponds to the ganged switches 100y, 100x and 104 (as modified by FIGURE 8A). The knobs 325 and 327 function as the wiper arms which set the potentiometers 324 and 326. If further desired, dials 396 and 398 cooperating with suitably wired circuits (not shown) may serve to alter the illumination of the display.

As a specific example, the values and dimensions of an operative construction embodying the invention are given below. In this case, each map is 6.75 inches per side, with the maximum dimension of the map mount equal to 7.25 inches.

| Part | Manufacturer | Manufacturer's Part Number |
| --- | --- | --- |
| 112y, 112x | Kearfott Company | CM40191-007 |
| 110y, 110x | do | C70353-001 |
| 134, 134' | do | CM00849450 |

Using the parts specified above, gears 42y may consist of two series coupled gear trains with reductions of 100:1 and 2.1428:1, respectively. Gear trains 136 and 136' may provide a reduction of 50:1, with gears 144 and 144' further reducing the shaft rotation so that a complete revolution of shaft 78 (or 80) will move the bug .675 inch. The following resistance values have been found satisfactory:

| Resistor or potentiometer: | Resistance (ohms) |
| --- | --- |
| 122 (maximum) | 20,000 |
| 138, 138' (maximum) | 20,000 |
| 324, 326' (maximum) | 20,000 |
| 143, 143' | 200,000 |
| 131, 131' | 200,000 |
| 330, 331 | 200,000 |
| 315, 319 | 31,470 |
| 316, 320 | 4,140 |
| 317, 321 | 2,030 |
| 318, 322 | 2,000 |

The voltage applied across each of the 20,000 ohm. potentiometers listed above may be 14.37 volts at 400 c.p.s. The energizing voltage for the relays A to K may be twenty-eight volts.

Although two selectively or independently usable preferred embodiments of the invention have been illustrated and described in detail, many modifications of the invention will be obvious to those skilled in the art. For example, obviously the inventive principles are not limited to tracking aircraft and could be applied with equal utility to any moving vehicle or object. Similarly, although the maps have been described with north-south and east-west coordinates and the servos as operating along up-down and left-right axes, it should be obvious that this nomenclature is used for purposes of convention and simplicity in explanation only. In the following claims, such terms are intended to designate two sets of rectangular coordinates, which, though normally as described above, could be otherwise. Indeed, it should be apparent that certain aspects of the invention are not limited to different sets of coordinates, or even to rectangular coordinates. Accordingly, the invention should not be limited except as defined in the following claims.

What is claimed is:

1. A direct view area map plotter for indicating on a map the position of an object relative to a terrain, comprising means for receiving a map in any of a plurality of orientations, an indicator, means for positioning said indicator over said map in response to the receipt of navigational data, and means for regulating, in accordance with the selected orientation of the inserted map relative to said map receiving means the direction relative to the plotter in which said positioning means moves said indicator.

2. A direct view area map plotter for indicating on a map the position of an object relative to a terrain, said map having first and second coordinates corresponding to first and second directions on said terrain, and wherein said map is contained on a map assembly including code means for identifying the orientation of said map relative to said map plotter comprising means for receiving the map assembly in any of a plurality of orientations, an indicator, first and second means for positioning said indicator over said map relative to said coordinates, and control means responsive to said code means for regulating in accordance with the selected orientation of said map, the direction in which said first and second means positions said indicator.

3. A direct view area map plotter for indicating on a map the position of an object relative to a terrain, said map having first and second coordinates corresponding to first and second directions on said terrain, and wherein said map is contained on a map assembly including code means for identifying the orientation of said map relative to said map plotter, comprising means for receiving said assembly in any of a plurality of orientations, an indicator, first and second positioning means having output shafts for positioning said indicator over said map relative to said coordinates, first means for deriving data relative to the position of an object with respect to said first direction, second means for deriving data relative to the position of said object with respect to said second direction, tracking control means responsive to said code means for coupling said first means to one of said positioning means and said second means to the other of said positioning means and for further regulating the direction of rotation of said output shafts to thereby position said indicator.

4. A direct view area map plotter according to claim 3, wherein said map assembly comprises a map mount to which said map is secured, said map mount including said code means.

5. A direct view area map plotter according to claim 4, wherein said control means is operative to switch the inputs to said first and second positioning means when a map assembly is inserted with the position of said first and second coordinates interchanged.

6. A direct view area map plotter according to claim 5, wherein said map is square.

7. A direct view area map plotter according to claim 5, including limiting means for inhibiting operation of said first and second positioning means when said indicator reaches an edge of the map inserted into said receiving means.

8. A direct view area map plotter according to claim 7, including means responsive to said map mount for indicating the orientation of the inserted map.

9. A direct view area map plotter comprising means for receiving a map having north-south and east-west coordinates, an indicator, up-down and left-right positioning means having output shafts for positioning said indicator over said map long up-down and left-right axes, respectively, first means for deriving data relative to the position of an object with respect to said north-south coordinate, second means for deriving data relative to the position of an object with respect to said east-west coordinate, means for identifying the orientation of an inserted map, and tracking control means responsive to said identifying means for coupling said first means to one of said positioning means and said second means to the other of said positioning means, said tracking control means further regulating the direction of rotation of said output shafts so that said up-down and left-right axes correspond to the north-south and east-west coordinates of the inserted map.

10. A direct view area map plotter according to claim 9, wherein said map is square.

11. A direct view area map plotter according to claim 8, further comprising a map mount to which said map is secured, said map mount including said identifying means.

12. A direct view area map plotter according to claim 11, wherein said tracking control means causes the output shaft of said up-down positioning means to rotate in one direction when north or east of the inserted map is up and in the opposite direction when either south or west is up, and the output shaft of said left-right positioning means to rotate in one direction when north or west is up and in the opposite direction when south or east is up.

13. A direct view area map plotter according to claim 12, wherein said tracking control means includes a plurality of switches, and said identifying means comprises notches on each side of said map mount for operating different combinations of said switches depending upon the up-direction of the inserted map.

14. A direct view area map plotter according to claim 13, further including slew control means for enabling manual adjustment of the indicator.

15. A direct view area map plotter according to claim 13, including limit switches for inhibiting both of said positioning means when said indicator reaches an edge of said inserted map.

16. Apparatus for indicating the path of an object relative to a terrain represented on a map having a predetermined scale, wherein said map is contained on a map assembly including code means for identifying the scale of said map, comprising means for receiving a map adapted to be inserted therein, said receiving means including means for sensing said code means, an indicator, means for moving said indicator over said map as a function of the position of said object relative to the terrain shown by said map, and scale control means responsive to said inserted map for causing said indicator-moving means to move said indicator at a rate corresponding to the scale of said inserted map.

17. Apparatus for indicating the path of an object relative to a terrain represented on a map having first and second coordinates, wherein said map is contained on a map assembly including code means for identifying the scale of said map, comprising means for receiving said and means for moving said indicator means with respect to map and for sensing said code means, indicator means, to both of said coordinates as a function of the position of said object relative to said terrain, and scale control means operatively connected to said moving means and said receiving means for varying the rate of movement of said indicator means as a function of the scale of the map inserted in said receiving means.

18. Apparatus according to claim 17, including means for simultaneously converting said object position into a plurality of separate quantities representative of the object position with respect to a plurality of differently scaled maps, said control means comprising scale switch means for selecting the quantity corresponding to the scale of the inserted map.

19. Apparatus according to claim 18, wherein each of said separate quantities includes a component corresponding to the object position with respect to said first coordinate and a component corresponding to the object position with respect to said second coordinate, said scaled switch means including first and second coordinate switches for selecting the corresponding components of said selected quantity.

20. Apparatus according to claim 19, wherein said converting means includes a plurality of rotatable output shafts, each of said shafts corresponding to one of said components, a potentiometer having a wiper arm connected from each of said shafts, said coordinate switches being operable to electrically connect the two wiper arms corresponding to the selected scale to said means for moving.

21. Apparatus according to claim 19, wherein said converting means includes first and second branches of series connected impedances, the voltages at the junction of adjacent impedances corresponding to said components.

22. Apparatus according to claim 20, including indexing means operatively coupled to at least one shaft associated with each coordinate for identifying the map which covers the area being traversed by the object.

23. Apparatus for plotting the path of an object relative to a terrain represented on a map having first and second coordinates, wherein said map is contained on a map assembly including code means for identifying the scale of said map, comprising means for receiving said map and for sensing said code means an indicator, means for moving said indicator with respect to both of said coordinates as a function of the position of said object relative to the area covered by said map, a plurality of first continuous potentiometers having wiper arms, a plurality of second potentiometers having wiper arms, means for rotating the wiper arms of said first potentiometers at differently scaled rates corresponding to the distance said object moves with respect to said first coordinate, and means for moving the wiper arms of said second potentiometers at differently scaled rates corresponding to the distance said object moves with respect to said second coordinate, scale control means being operatively connected between said wiper arms and said moving means, and responsive to signals from said receiving means, for varying the rate of movement of said indicator as a function of the scale of the map inserted in said receiving means.

24. A direct view area map plotter for plotting the path of an object relative to a terrain represented on a map having first and second coordinates, comprising means for receiving said map in any of a plurality of orientations, means for identifying the scale and orientation of a received map, an indicator, means for moving said indicator with respect to both of said coordinates as a function of the position of said object relative to the area covered by said map, and control means operatively connected to said moving means and responsive to said identifying means for varying the rate and direction of movement of said indicator as respective functions of the scale and orientation of a map inserted in said receiving means.

25. A direct view area map plotter according to claim 24, including means for simultaneously converting said object position into a plurality of separate quantities representative of the object position with respect to a plurality of differently scaled maps, said control means comprising scale switch means for selecting the quantity corresponding to the scale of the inserted map.

26. A direct view area map plotter according to claim 25, wherein said means for moving comprises first motor means having an output shaft for moving said indicator along a first axis and second motor means having an output shaft for moving said indicator along a second axis transverse to said first axis.

27. A direct view area map plotter according to claim 26, wherein each of said separate quantities includes a component corresponding to the object position with respect to said first coordinate and a component corresponding to the object position with respect to said second coordinate, said scaled switch means including first and second coordinate switches for selecting the corresponding components of said selected quantity.

28. A direct view area map plotter according to claim 27, wherein said control means further comprises tracking means for coupling the outputs of said first and second coordinate switches to respective ones of said motor means and for determining the direction of rotation of said output shafts depending upon the orientation of the inserted map.

29. A direct view area map plotter according to claim 28, wherein said map is mounted on a map mount, said map mount including said identifying means, said identifying means actuating said coordinate switches and said tracking means.

30. A direct view area map plotter according to claim 29, including means responsive to said identifying means for manifesting the sealed scale and map orientation.

31. A direct view area map plotter according to claim 30, wherein said converting means includes a plurality of rotatable output shafts, each of said shafts corresponding to one of said components, a potentiometer having a wiper arm connected from each of said shafts, said coordinate switches being operable to electrically connect the two wiper arms corresponding to the selected scale to said tracking means.

32. A direct view area map plotter according to claim 31, comprising indexing means responsive to the rotation of said output shafts of said connecting means for identifying the map corresponding the ground area traversed by said object.

33. A direct view area map plotter comprising means for receiving an inserted map having north-south and east-west coordinates in any of a plurality of orientations, an indicator, up-down and left-right servo means having output shafts for positioning said indicator over said map along up-down and left-right axes, respectively, first means having a plurality of differently scaled outputs indicative of the position of an object with respect to said north-south coordinate, second means having a plurality of differently scaled outputs indicative of the position of said object with respect to said east-west coordinate, and control means responsive to the scale and up-direction of the inserted map for coupling one output of said first means to one of said servos and the corresponding scaled output of said second means to the other of said servo means, said control means further determining the direction and rotation of said output shafts so that said up-down and left-right axes correspond to the north-south and east-west coordinates of the inserted map.

34. A direct view area map plotter for plotting the path of an object on a map having north-south and east-west coordinates, said map being secured to a map mount, comprising:
  (a) means for receiving said map mount,
  (b) north-south and east-west channels, each of said channels including
    (1) a translator having an output shaft for converting position information into an angular displacement of its output shaft,
    (2) first gear reduction means coupled to said output shaft for reducing the angular velocity of said shaft to a value commensurate with a fixed scale map,
    (3) at least one second gear reduction means series connected with said first gear reduction means for further reducing said shaft velocity whereby the output of said second gear reduction means corresponds to a lower scale map,
    (4) first and second memory means mechanically coupled to the outputs of said first and second gear reduction means for continually producing output voltages which vary as functions of the object position along the associated coordinate,
  (c) a north-south scale switch connected to the outputs of said memory means in said north-south channel,
  (d) an east-west scale switch connected to the outputs of the memory means in said east-west channel, each of said scale switches being responsive to a scale control signal from said receiving means for passing the voltage corresponding to the scale of said map,
  (e) an up-down servo including an output shaft for positioning said indicator along the up-down axis of said plotter,
  (f) a left-right servo including an output shaft for positioning said indicator along the left-right axis of said plotter,
  (g) and tracking control means coupled to the outputs of said north-south and east-west scale switches, said tracking control means normally connecting the output of said north-south scale switch to said up-down servo, and the output of said east-west scale switch to said left-right servo, and responsive to tracking control signals from said receiving means for reversing the inputs to said servos and for causing said up-down output shaft to rotate in one direction when a map is inserted with north or east up and in the other direction when a map is inserted with south or west up, and for causing said left-right output shaft to rotate in one direction when a map is inserted with north or west up and in the other direction when a map is inserted with south or east up.

35. A direct view area map plotter according to claim 34, wherein said scale and tracking control signals from said receiving means are initiated by a plurality of switches, said switches being responsive to notches in said map mount for generating said control signals.

36. A direct view area map plotter according to claim 35, including north-south index means connected to the output of the first gear reduction means in said north-south channel, and an east-west index connected to the output of the first gear reduction means in said east-west channel for manifesting the high scale map corresponding to the position of said object.

37. A direct view area map plotter according to claim 36, including slew control means connected to the inputs of said translators for rotating the respective output shafts thereof to permit manual positioning of said indicator.

38. A direct view area map plotter according to claim 37, wherein said map mount comprises a four-sided board, each side of said board including a first and a second notch, each of said first notches being of equal size for actuating the switches which control the scale selection of said map plotter, each of the second notches having a different length whereby different combinations of the switches which control the tracking will be actuating depending upon the up-direction of the inserted map.

39. A direct view area map plotter according to claim 38, including indicating means for manifesting the scale and up-direction of the inserted map, said indicating means including an actuator bar positioned for engagement with a long and short notch of said map mount.

40. A direct view area map plotter, comprising a map, a mount supporting said map, map display means for receiving said map upon insertion of said mount therein, said mount having a configuration representative of the scale of said map, an indicator, means for positioning said indicator over said map, and means responsive to coaction of said mount configuration and said display means, for regulating the rate of movement of said indicator over said map.

41. For use in a direct view area map plotter wherein means are provided to position an indicator with respect to differently scaled and oriented maps and including a scale selection mechanism and an orientation selection mechanism, a map mount comprising a four-sided board, each side of said board including a first and second configuration, each of said first configurations being the same and adapted to actuate said scale selection mechanism of said map plotter, each of the second configurations being different from each other and corresponding respectively to one orientation of the inserted map and adapted to actuate said orientation selection mechanism of said map plotter.

42. For use in a direct view area map plotter wherein means are provided to position an indicator with respect to differently scaled and oriented maps, and wherein switches are used to control the scale selection and the orientation selection of the map plotter, a map mount for receiving said map, said map mount comprising a four-sided board, each side of said board including a first and second notch, each of said first notches being of equal size for actuating the switches which control the scale selection of said map plotter, each of the second notches having a different length for actuating different combination of switches which control the orientation selection of the map plotter depending upon the orientation of the inserted map.

43. A direct view area map plotter, comprising means for receiving a map in any of a plurality of orientations, said map having first and second coordinates, an indicator, first and second servo means for positioning said indicator with respect to said map relative to said coordinates, said servo means each including a manual positioning input and at racking input, two variable voltage generators for connection to said manual positioning inputs, tracking control means responsive to position information relative to said first coordinate and said second coordinate, said tracking control means operable depending upon the orientation of the inserted map for coupling said position information to said tracking inputs and said variable voltage generators to said manual positioning inputs to thereby control the position of said indicator as a function of said position information and the output of said variable voltage generators, and means for opening said tracking inputs to establish a reference point for said servos as functions of the outputs of said variable voltage generators alone.

44. A direct view area map plotter comprising means for receiving a map in any of a plurality of orientations, said map having north-south and east-west coordinates, an indicator, up-down and left-right servo means having respective output shafts for positioning said indicator with respect to said map along up-down and left-right axes, each of said servos including a manual positioning input and a tracking input, north-south and east-west potentiometers having wiper arms for connection to said manual positioning inputs, input means for generating position information of an object relative to said north-south coordinate and said east-west coordinate, said tracking control means operable depending upon the orientation of the inserted map for coupling said position information to said tracking inputs and said wiper arms to said manual positioning inputs to thereby control the position of said indicator as a function of said position information and the voltage on said wiper arms, and means for opening said tracking inputs to establish a reference point for said servos a function of the voltage on said wiper arms alone.

45. A direct view area map plotter according to claim 44, wherein said tracking control means normally couples said north-south coordinate information and the north-south wiper arm to said up-down servo, and said east-west coordinate information and the east-west wiper arms to said left-right servo, said tracking control means being responsive to a signal from said receiving means for interchanging the inputs to said servos when a map is received with east or west up, said tracking control means further causing the output shaft of said north-south servo to rotate in one direction when a map is received with north or east up and in the other direction when a map is received with south or west up, and for causing the output shaft of said left-right servo to rotate in one direction when a map is inserted with north or west up and in the other direction when a map is inserted with south or east up.

46. A direct view area map plotter according to claim 45, wherein said input means simultaneously converts said object position into a plurality of separate voltages representative of the object position with respect to a plurality of different scale maps, and scale control means for selecting the voltages corresponding to the scale of the map inserted into said receiving means.

References Cited

UNITED STATES PATENTS

| | | | |
|---|---|---|---|
| 2,058,306 | 10/1936 | Fowler | 343—112 |
| 2,169,532 | 8/1939 | Jensen | 343—112 |
| 2,307,029 | 1/1943 | Elm | 343—112 |
| 2,718,061 | 9/1955 | Omberg et al. | 33—1 |
| 2,836,816 | 5/1958 | Allison et al. | 343—112 |
| 2,857,234 | 10/1958 | Murray | 346—8 |
| 2,907,620 | 10/1959 | Luik | 346—8 |
| 3,293,599 | 12/1966 | Nay et al. | 346—8 XR |

FOREIGN PATENTS

| | | |
|---|---|---|
| 692,357 | 8/1964 | Canada. |

LEONARD FORMAN, *Primary Examiner.*

JOEL M. FREED, *Assistant Examiner.*

UNITED STATES PATENT OFFICE
CERTIFICATE OF CORRECTION

Patent No. 3,392,448                                               July 16, 1968

George G. Rock

It is certified that error appears in the above identified patent and that said Letters Patent are hereby corrected as shown below:

Column 3, line 28, "may" should read -- map --; line 50, "known" should read -- know --. Column 7, line 45, "be", first occurrence, should read -- also --. Column 14, line 20, "an" should read -- and --. Column 19, line 35, "long" should read -- along --. Column 20, line 20, cancel "map and for sensing said code means, indicator means," and insert same after "said" in line 18, same column 20; line 63, "an" should read -- , an --. Column 21, line 66, "connecting" should read -- converting --. Column 23, line 64, "at racking" should read -- a tracking --. Column 24, line 27, after "servos" insert -- as Signed and sealed this 10th day of March 1970.

(SEAL)
Attest:

Edward M. Fletcher, Jr.                                     WILLIAM E. SCHUYLER, JR.
Attesting Officer                                                 Commissioner of Patents